(12) United States Patent
Akita

(10) Patent No.: US 8,295,949 B2
(45) Date of Patent: Oct. 23, 2012

(54) CONTROL SYSTEM, CONTROL METHOD, MASTER DEVICE, AND CONTROL DEVICE

(75) Inventor: Tadashi Akita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 201 days.

(21) Appl. No.: 12/766,175

(22) Filed: Apr. 23, 2010

(65) Prior Publication Data

US 2010/0211190 A1    Aug. 19, 2010

Related U.S. Application Data

(63) Continuation of application No. PCT/JP2007/072258, filed on Nov. 16, 2007.

(51) Int. Cl.
*G05B 19/18* (2006.01)
*G05B 9/02* (2006.01)
*G06F 15/16* (2006.01)
*G06F 3/00* (2006.01)
*G06F 13/00* (2006.01)
*G06F 11/00* (2006.01)

(52) U.S. Cl. .......... 700/3; 700/82; 709/211; 710/6; 710/17; 710/18; 710/19; 710/110; 714/1

(58) Field of Classification Search .......... 700/3, 79, 700/82; 709/208–211; 710/5, 6, 15, 17–19, 710/107, 110; 714/100, 1
See application file for complete search history.

(56) References Cited

U.S. PATENT DOCUMENTS 4,775,976 A * 10/1988 Yokoyama .......... 714/4.4
4,805,085 A * 2/1989 Mogi et al. .......... 700/3
5,032,975 A    7/1991 Yamamoto
5,224,097 A * 6/1993 Kaneshima .......... 370/449

(Continued)

FOREIGN PATENT DOCUMENTS
EP        511795 A1 * 11/1992
(Continued)

OTHER PUBLICATIONS

Form PCT/ISA/210 in corresponding International Application No. PCT/JP2007/072258 (3 PP.).

(Continued)

*Primary Examiner* — Crystal J Barnes-Bullock
(74) *Attorney, Agent, or Firm* — Staas & Hasley LLP

(57) ABSTRACT

There is provided a control system comprising: a master device that includes: a first transmission section that transmits, to a plurality of slave devices connected thereto through a network, a control command for the slave devices to control a device to be controlled and a flag that have two or more values; and a second transmission section that transmits, to the plurality of slave devices, a control start command for the slave devices to simultaneously start performing control based on the control command transmitted by the first transmission section, and a slave device that includes: a reception section that receives the control command and flag transmitted from the master device; a control command storage section that stores the control command received by the reception section in a storage section in the case where the flag received by the reception section has a specified value; and a first control start section that receives the control start command transmitted from the master device and starts performing control of the device to be controlled based on the control command stored in the storage section using the control start command as a trigger.

16 Claims, 19 Drawing Sheets

U.S. PATENT DOCUMENTS

| | | | |
|---|---|---|---|
| 5,850,338 A | 12/1998 | Fujishima | |
| 7,065,391 B2 * | 6/2006 | Kanayama et al. | 455/574 |
| 7,558,646 B2 | 7/2009 | Matsumoto | |
| 7,650,441 B2 * | 1/2010 | Lee | 710/30 |
| 2005/0055132 A1 | 3/2005 | Matsumoto | |
| 2007/0243003 A1 | 10/2007 | Kinoshita | |

FOREIGN PATENT DOCUMENTS

| | | |
|---|---|---|
| JP | 64-41902 | 2/1989 |
| JP | 4-93114 | 3/1992 |
| JP | 4-300182 | 10/1992 |
| JP | 6-245280 | 9/1994 |
| JP | 7-75357 | 3/1995 |
| JP | 08-237769 | 9/1996 |
| JP | 9-146623 | 6/1997 |
| JP | 2000-269988 | 9/2000 |
| JP | 2000-330628 | 11/2000 |
| JP | 2000-358069 | 12/2000 |
| JP | 2001-147706 | 5/2001 |
| JP | 2001-222308 | 8/2001 |
| JP | 2003-145462 | 5/2003 |
| JP | 2004-242031 | 8/2004 |
| JP | 2005-14150 | 1/2005 |
| JP | 2005229322 A * | 8/2005 |
| JP | 2007-283593 | 11/2007 |
| WO | 02/089419 | 11/2002 |

OTHER PUBLICATIONS

Form PCT/ISA/220 in corresponding International Application No. PCT/JP2007/072258 (4 PP.).

Form PCT/ISA/237 in corresponding International Application No. PCT/JP2007/072258 (5 PP.).

English Translation of the International Preliminary Report on Patentability issued Jun. 29, 2010 in corresponding International Patent Application PCT/JP2007/072258.

Japanese Office Action for corresponding Japanese Application 2009-541007; dated Feb. 7, 2012.

* cited by examiner

CONTROL SYSTEM, CONTROL METHOD, MASTER DEVICE, AND CONTROL DEVICE

CROSS-REFERENCE TO RELATED APPLICATIONS

This application is a continuation application, filed under 35 U.S.C. §111(a), of PCT Application No. PCT/JP2007/072258, filed on Nov. 16, 2007, the disclosure of which is herein incorporated in its entirety by reference.

FIELD

The present invention relates to a control system that starts control of a plurality of devices to be controlled simultaneously, a control method, a master device, and a control device.

BACKGROUND

As a method for performing communication between devices, serial communication and parallel communication are known. In the parallel communication, data of a plurality of bits are transmitted/received simultaneously using a plurality of signal lines, while in the serial communication, data is transmitted/received bit by bit using a single signal line. As is clear from the difference between two communication methods, the serial communication has an advantages that its simpler structure allows longer distance communication than the parallel communication.

As a conventional technique relating to the present invention, there is known a slave stations simultaneous start-up method that outputs, to a plurality of slave stations that control their corresponding devices, control data and a start-up signal for use in the slave stations to thereby start up the slave stations simultaneously (refer to, e.g., Patent Document 1).
[Patent Document 1] Japanese Laid-open Patent Publication No. 07-75357

However, in order to control a plurality of devices in 1:n serial communication, it is necessary to issue a control instruction for each transmission destination in series. That is, it is necessary to communicate with one device after waiting for a time required for communication with a previous device. Hereinafter, with reference to FIGS. 20 and 21, problems in the serial communication will be described.

FIG. 20 is a view illustrating a control system using conventional serial communication, and FIG. 21 is a flowchart illustrating operation of a master device in a communication system using conventional serial communication.

As illustrated in FIG. 20, a control system using conventional serial communication includes a working device 1, a master device 2 that instructs the working device 1 to perform work, and a serial cable 3 that connects the working device 1 and master device 2. The working device 1 includes a leading end portion 1a having a predetermined function and motors 1x to 1z for moving the leading end portion 1a in three axial directions denoted by X, Y, and Z arrows. Not illustrated control devices are connected to the motors 1x to 1z, and the master device 2 transmits an operation command to the control devices serving as slave devices. When moving the leading end portion in the three axial directions, the master device 2 that transmits an operation command to the not illustrated control devices controlling the motors 1x to 1z performs processing as illustrated in FIG. 21.

The master device 2 transmits a command to the control device corresponding to the motor 1x (S801) and then receives a reply to the command from the control device of the motor 1x (S802). Then, the master device 2 transmits a command to the control device corresponding to the motor 1y (S803) and then receives a reply to the command from the control device of the motor 1y (S804). Finally, the master device 2 transmits a command to the control device corresponding to the motor 1z (S805) and then receives a reply to the command from the control device of the motor 1z (S806).

As described above, the axes of the working device 1 do not move simultaneously. That is, the working device 1 operates not simultaneously but sequentially with a time interval required for communication every time the axis to be moved is switched. Each of the control devices of the motors 1x to 1z has a previously assigned selection address which is a unique address and, for execution of the received command, determines whether the selection address added to the command coincides with the selection address assigned to the control device itself.

The time difference caused among the motors 1x to 1y may pose a problem that the leading end portion 1a cannot move on a trajectory of an intended curve or straight line. Further, when a device to be controlled, not only the motor, needs to be brought into an emergency stop, it is necessary to repeatedly and individually transmit the same command to control devices corresponding to the devices to be controlled. Further, a time period required for the last device to be started-up is increased in proportion to the number of devices to be controlled.

The technique disclosed in Patent Document 1 is a technique in which a main control device simultaneously starts up devices to be controlled by transmitting a control command for making the devices to be controlled work and a simultaneous start-up request to a plurality of slave stations (control devices) by multicasting. Thus, in the case of an inexpensive low speed communication system, the multicasting of the control command and simultaneous start-up request to a plurality of slave stations makes a time period from when the main control device issues the start-up request to when it actually makes the devices to be controlled work longer. Further, the multicasting of the start-up signal is necessary in the case where only one slave station is started up, which is disadvantageous in an environment where control is often made for a single slave station.

SUMMARY

According to an aspect of the invention, a control system includes: a master device that includes: a first transmission section that transmits, to a plurality of slave devices connected thereto through a network, a control command for the slave devices to control a device to be controlled and a flag that have two or more values; and a second transmission section that transmits, to the plurality of slave devices, a control start command for the slave devices to simultaneously start performing control based on the control command transmitted by the first transmission section, and a slave device that includes: a reception section that receives the control command and flag transmitted from the master device; a control command storage section that stores the control command received by the reception section in a storage section in the case where the flag received by the reception section has a specified value; and a first control start section that receives the control start command transmitted from the master device and starts performing control of the device to be controlled based on the control command stored in the storage section using the control start command as a trigger.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Embodiments of the present invention will be described below with reference to the accompanying drawings.

First Embodiment

Figure 1:
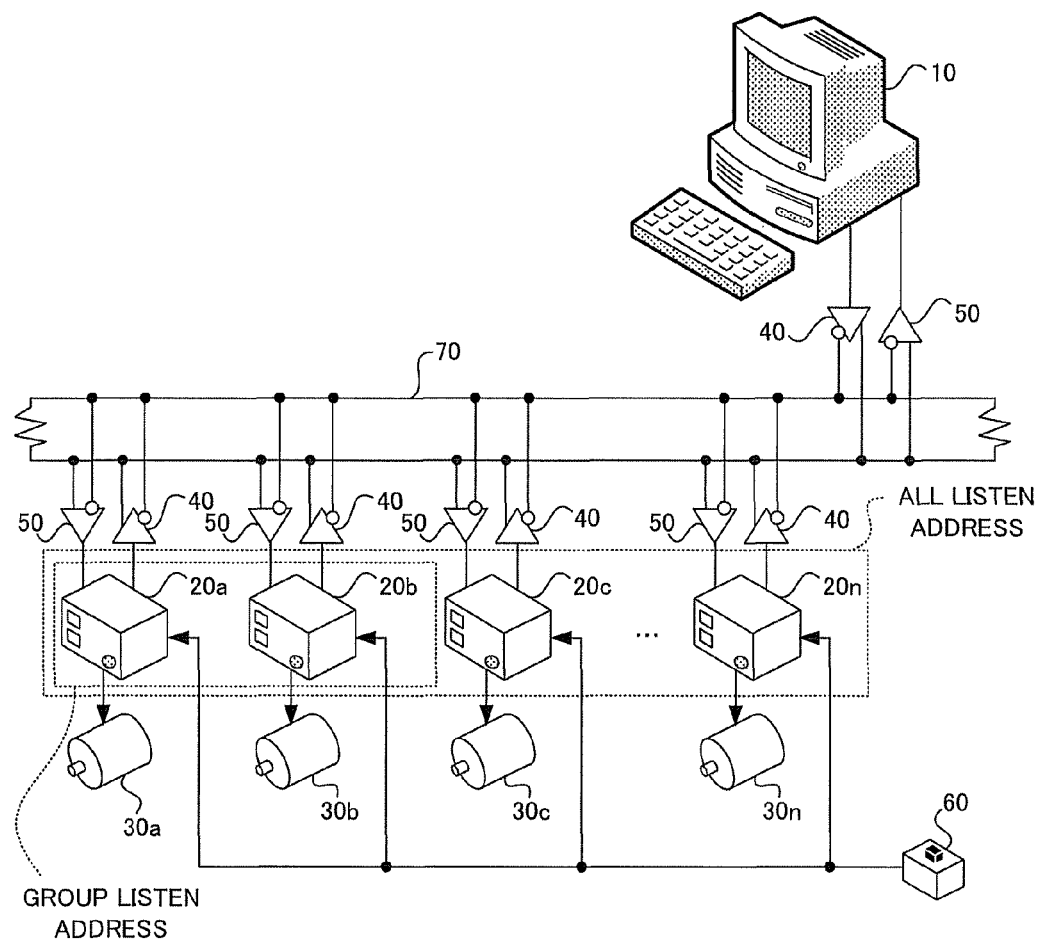
FIG. 1 is a view illustrating a configuration of a control system according to a first embodiment.
Figure 2:
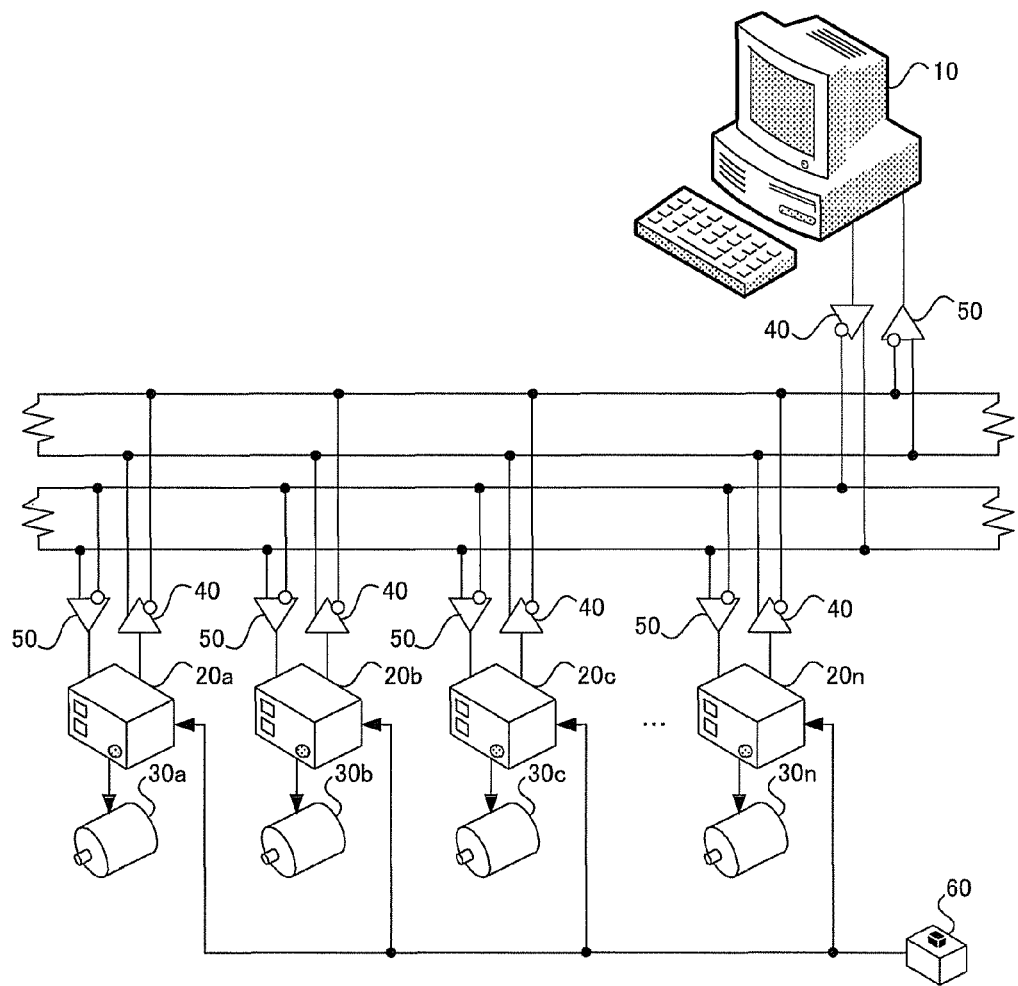
FIG. 2 is a view illustrating another configuration of a control system according to the first embodiment.

First, a configuration of a control system according to a first embodiment will be described. FIG. 1 is a view illustrating a configuration of a control system according to the present embodiment, and FIG. 2 is a view illustrating another configuration of a control system according to the present embodiment.

A control system according to the present embodiment includes a personal computer 10 (master device), control devices 20a to 20n (slave devices), motors 30a to 30n (devices to be controlled), drivers 40, receivers 50, and a hardware switch 60 (output device). The personal computer 10 and control devices 20a to 20n are multipoint connected by an RS-485 cable 70.

The personal computer 10 transmits to the control devices 20a to 20n a command for controlling the motors 30a to 30n. The control devices 20a to 20n interpret data received from the personal computer 10 so as to drive the motors 30a to 30n. The motors 30a to 30n are driven by the control devices 20a to 20n. The motors 30a to 30n may be replaced by other devices such as LEDs as long as they are driven by the control devices 20a to 20n.

In the present embodiment, the motors 30a to 30n are controlled to move screw fastening devices to predetermined positions at predetermined speeds, and the screw fastening devices each move in a specified direction and perform screw fastening.

The hardware switch 60 can switch ON and OFF. At OFF time, the hardware switch 60 transmits a FALSE signal to the connected control devices 20a to 20n, while at ON time, it transmits a TRUE signal (signal that can have two or more values) to the connected control devices 20a to 20n. The hardware switch 60 may be sensors, etc., provided in the motors 30a to 30n. Although the hardware switch 60 is connected to all the control devices 20a to 20n in the present embodiment, it may be connected to only a specified control device (e.g., control device 20a).

The RS-485 cable 70 is a cable for serial communication and connects the personal computer 10 and control devices 20a to 20n. The RS-485 cable 70 may be replaced by any other cable as long as the personal computer 10 and control devices 20a to 20n can be connected, and a network of a different type may be employed.

The drivers 40 are each a driver IC that drives the RS-485 cable 70. Each driver 40 has a not-illustrated ENABLE terminal and can output data of a connected device to the RS-485 cable when the ENABLE terminal is TRUE, while when the ENABLE terminal is FALSE, it puts its output as a high impedance state to release the RS-485 cable to another station. The receivers 50 are each an IC that converts a differential signal of the RS-485 cable into a TTL (Transistor-Transistor Logic) level and inputs it to a connected device.

Selection addresses, which are device unique addresses, are assigned to the control devices 20a to 20n and further all listen addresses, which are common to all the control devices, are assigned thereto. In addition, group listen address, which are common to a specified number of control devices, are assigned to the control devices 20a and 20b.

Each of the control devices 20a to 20n retains a software trigger standby flag (flag that can have two or more values) as a flag for determining whether it suspends execution of control to be performed based on a transmitted control command and a trigger flag as a flag for determining which signal is used as a trigger to start up the control in the case where the control is suspended. The personal computer 10 previously transmits a software trigger standby flag value to the control devices 20a to 20n together with the control command for controlling the motors 30a to 30n. When receiving a specified software trigger standby flag value to be described later, the control devices 20a and 20b suspend their operation. The personal computer 10 transmits a command serving as a start-up trigger to all the control devices 20a to 20n using the all listen address or group listen addresses to thereby allowing the control devices in each of which the transmitted address and its own address coincide with each other to simultaneously start up the corresponding motors. Further, a signal from the hardware switch 60 can be used as a trigger to allow the control devices to simultaneously start up the corresponding motors.

In the present embodiment, a command that is transmitted from the personal computer 10 as a trigger for starting up the suspended control is referred to a software trigger command, and a signal that is transmitted from the hardware switch 60 as the start-up trigger is referred to a hardware trigger command. Further, the drivers 40 and receivers 50 are incorporated in the personal computer 10 and respective control devices 20a to 20n. Further, the selection address is expressed in ASCII code (upper-case characters from A to Z), the all listen address is expressed by * (asterisk) as a different ASCII code from that of the selection address, and the group listen address is expressed by an address unique to each group as a different ASCII code from those of the selection address and all listen address. Further, although the personal computer 10 and control devices 20a to 20n are multi-point connected by the RS-485 cable 70 in the control system of FIG. 1, the connection topology between them may be a mutidrop connection as illustrated in FIG. 2.

Figure 3:
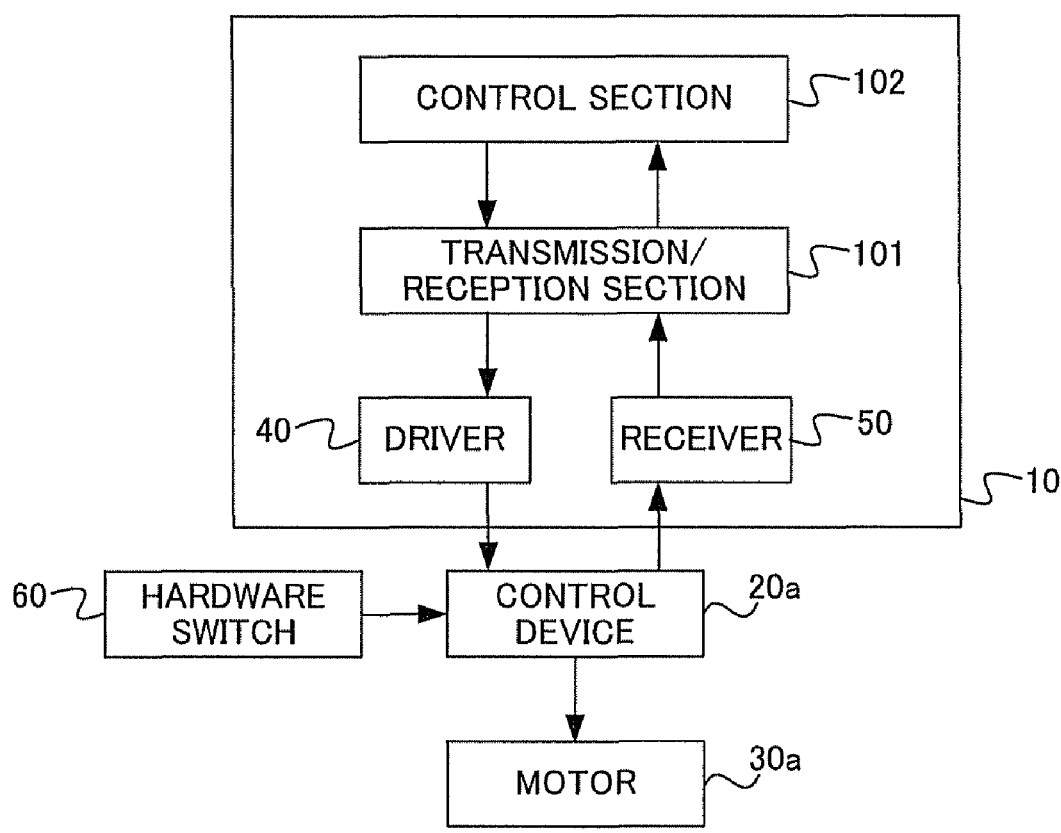
FIG. 3 is a block diagram illustrating a configuration of a personal computer according to the first embodiment.

Next, a configuration of the personal computer will be described. FIG. 3 is a block diagram illustrating a configuration of the personal computer. For simplification, it is assumed that only the control device 20a is connected to the personal computer 10.

As illustrated in FIG. 3, the personal computer 10 includes a driver 40, a receiver 50, a transmission/reception section 101 (first transmission section, second transmission section, third transmission section), a control section 102 (first transmission section, second transmission section, third transmission section). The transmission/reception section 101 transmits through the driver 40 various commands and software trigger standby flag values to the control device 20a and receives through the receiver 50 a reply to the transmitted command. The control section 102 controls the transmission/reception section 101.

Figure 4:
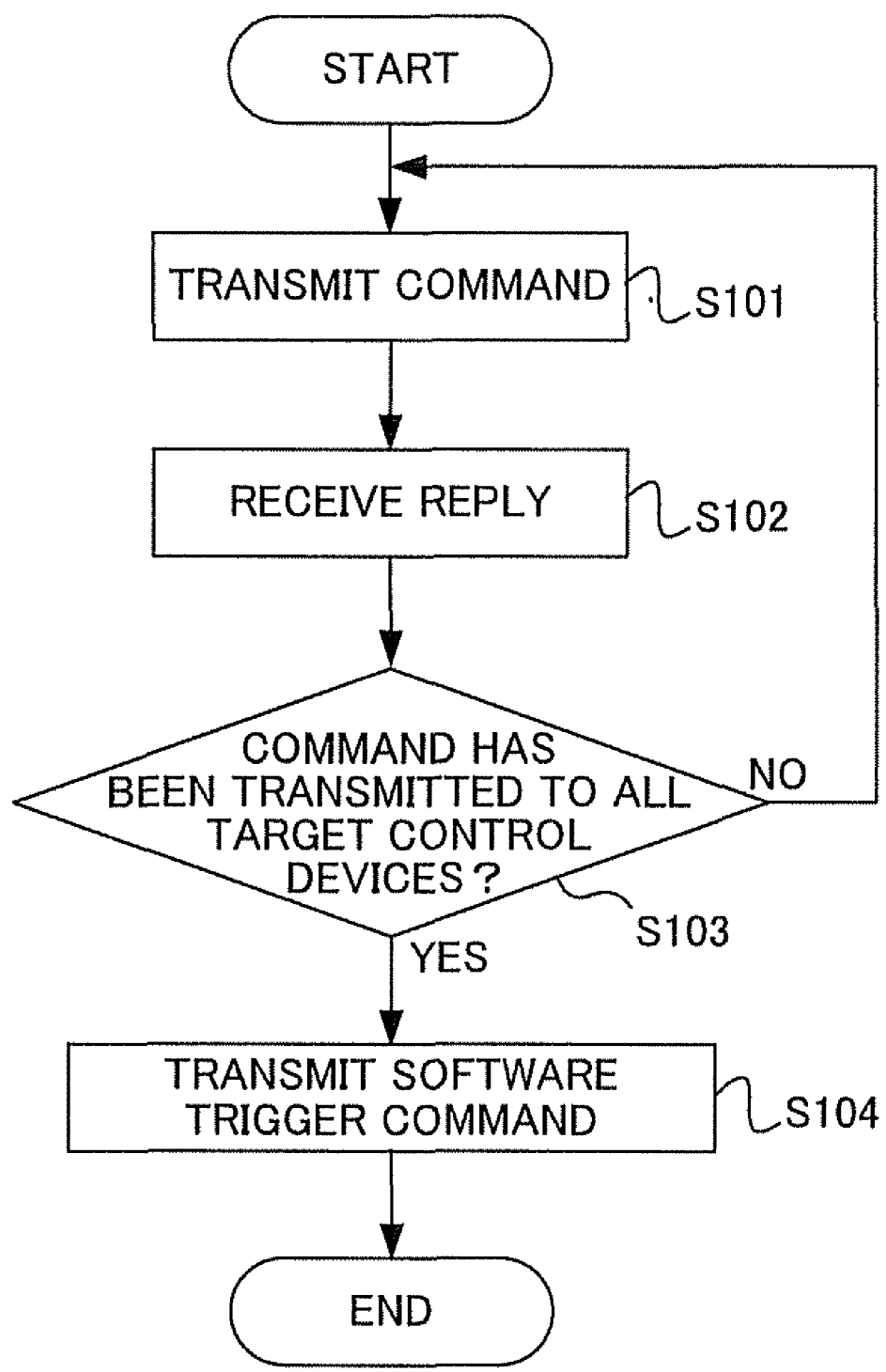
FIG. 4 is a flowchart illustrating operation of the personal computer according to the first embodiment.

Next, operation of the personal computer will be described. FIG. 4 is a flowchart illustrating operation of the personal computer.

The control section 102 controls the transmission/reception section 101 to transmit a control command to the control devices (e.g., a control device 20a) (S101) and to receive a reply to the control command (S102). The control section 102 then determines whether the control command has been transmitted to all the target control devices (S103).

When determining that the control command has been transmitted to all the target control devices (YES in step S103), the control section 102 transmits the software trigger command to all the connected control devices 20a to 20n or specified number of control devices 20a and 20b using the all listen address or group listen addresses (S104).

When determining that the control command has not been transmitted to all the target control devices (NO in step S103), the control section 102 controls the transmission/reception section 101 to transmit the control command once again to the control devices (e.g., control device 20b) (S101).

Figure 5:
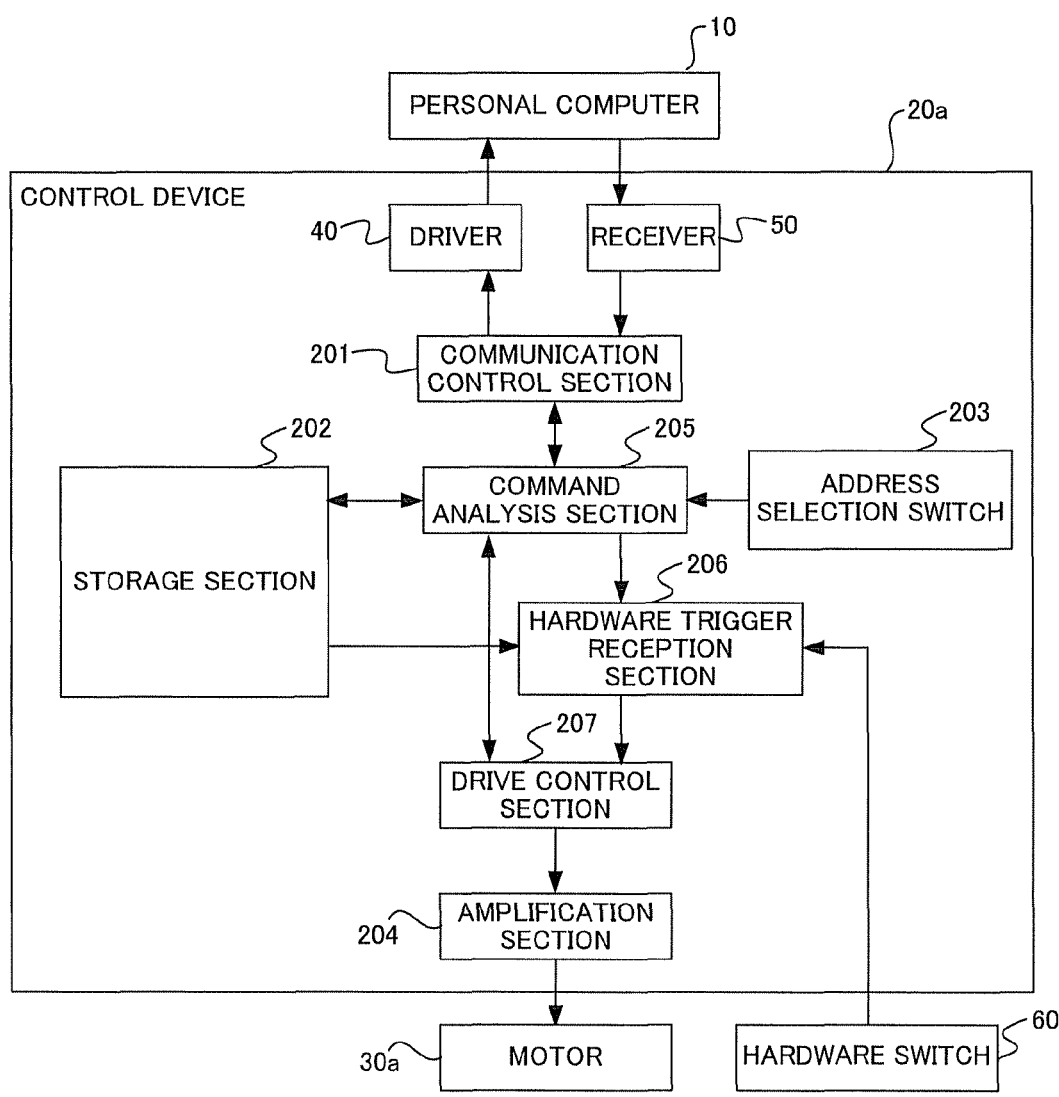
FIG. 5 is a block diagram illustrating a configuration of a control device according to the first embodiment.
Figure 6:
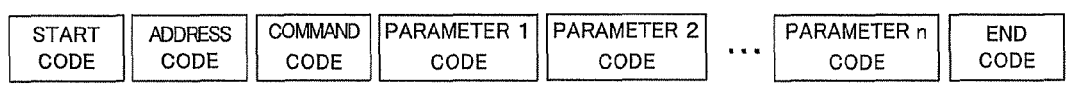
FIG. 6 is a view illustrating signals transmitted from the personal computer to the control device.
Figure 7:
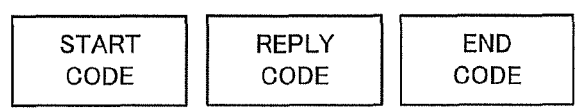
FIG. 7 is a view illustrating signals transmitted from the control device to the personal computer.

Next, a configuration of the control device according to the present embodiment will be described. FIG. 5 is a block diagram illustrating a configuration of the control device according to the present embodiment. FIG. 6 is a view illustrating signals transmitted from the personal computer to the control device, and FIG. 7 is a view illustrating signals transmitted from the control device to the personal computer. It is assumed that the plurality of control devices illustrated in FIGS. 1 and 2 have the same configuration, and only the configuration of the control device 20a is illustrated in FIG. 5 as one example.

The control device 20a according to the present embodiment includes a driver 40, a receiver 50, a communication control section 201 (reception section), a storage section 202, an address selection switch 203, an amplification section 204, a command analysis section 205 (control command storage section, first control start section), a hardware trigger reception section 206 (second control start section) and a drive control section 207 (first control start section, second control start section).

The communication control section 201 performs communication control using, e.g., an asynchronous communication method in the hardware part and is configured to receive a signal transmitted from the personal computer 10 through the receiver 50 and transmit through the driver 40 a signal as a reply to the received signal to the personal computer 10. Further, when detecting, in interrupt processing software part, a start code in a command sequence as illustrated in FIG. 6, the communication control section 201 starts buffering and sequentially receives subsequent address code (selection address, all listen address, or group listen address), various commands (to be described later), parameters 1 to n (to be described later), check sum codes (to be described later), and the like and, when detecting the end code, ends buffering and notifies the command analysis section 205 of the received data. Whether the command can be executed or not is determined as a result of the command analysis of the command analysis section 205 and, when a reply code (sometimes data such as status information or position information or check sum code is added to the reply code according to need) as illustrated in FIG. 7 is given to the communication control section 201, the communication control section 201 adds the start and end codes to the reply code, sets the state of the ENABLE terminal of the driver 40 to TRUE, and transmits a reply sequence to the personal computer 10. After completion of the transmission, the state of the ENABLE terminal is set back to FALSE.

Examples of the received command include a software trigger command, a trigger standby cancel command, a hardware trigger standby' transition command, a trigger flag reference command, an operation status reference command, and a control command. Examples of the control command include a position control command, a speed control command, and a screw fastening command. Further, a software trigger standby flag having a value of ON or OFF is added to the control command as parameters. Parameters of the various commands and control commands will be described later.

The command analysis section 205 analyzes commands other than the abovementioned commands and determines whether the analyzed command can be executed by the drive control section 207. Further, the command analysis section 205 instructs the drive control section 207 to execute drive control based on the control command and its parameters. Furthermore, the command analysis section 205 retains the software trigger standby flag and trigger flag. When the software trigger standby flag is set to ON, the command analysis section changes the value of the trigger flag to a specified value and stores the corresponding control command and its parameters in the storage section. The trigger flag will be described below.

The trigger flag is a flag whose value is set to an integer from 0 to 3 and indicates the following four statuses as conditions. That is, in the present embodiment, 0 indicates a non trigger standby status, 1 indicates a software trigger standby status, 2 indicates a hardware trigger standby status, and 3 indicates a trigger issued status. Operations under the respective conditions will be described later.

The hardware trigger reception section 206 receives a hardware trigger which is a signal transmitted from the hardware switch 60. When receiving the hardware trigger from the hardware switch 60 under the condition that the trigger flag indicates the hardware standby status, the hardware trigger reception section 206 instructs the drive control section 207 to start execution of the control based on the stored control command and its parameters. The hardware trigger is transmitted in the wake of the TRUE signal from the hardware switch 60.

The drive control section 207 drives the motor 30a based on the command and its parameters given by the command analysis section 205 or hardware trigger reception section 206. For example, in the case of a device that is moved by means of the drive of the motor 30a, the parameters are values indicating a target position, a moving speed, an acceleration rate, and the like. The drive control section 207 may perform feedback control such that the given parameter coincides with the actual operation of the motor 30a. Further, the drive control section 207 outputs an operation status. That is, the drive control section 207 outputs TRUE when the motor 30a is in operation and outputs FALSE when the motor 30a is stopped.

The amplification section 204 amplifies power so as to drive the motor 30a. The storage section 202 stores commands and their parameters. The address selection switch 203 is a switch for an administrator of the control system to set the selection address and group listen address of the control device 20a.

Figure 8:
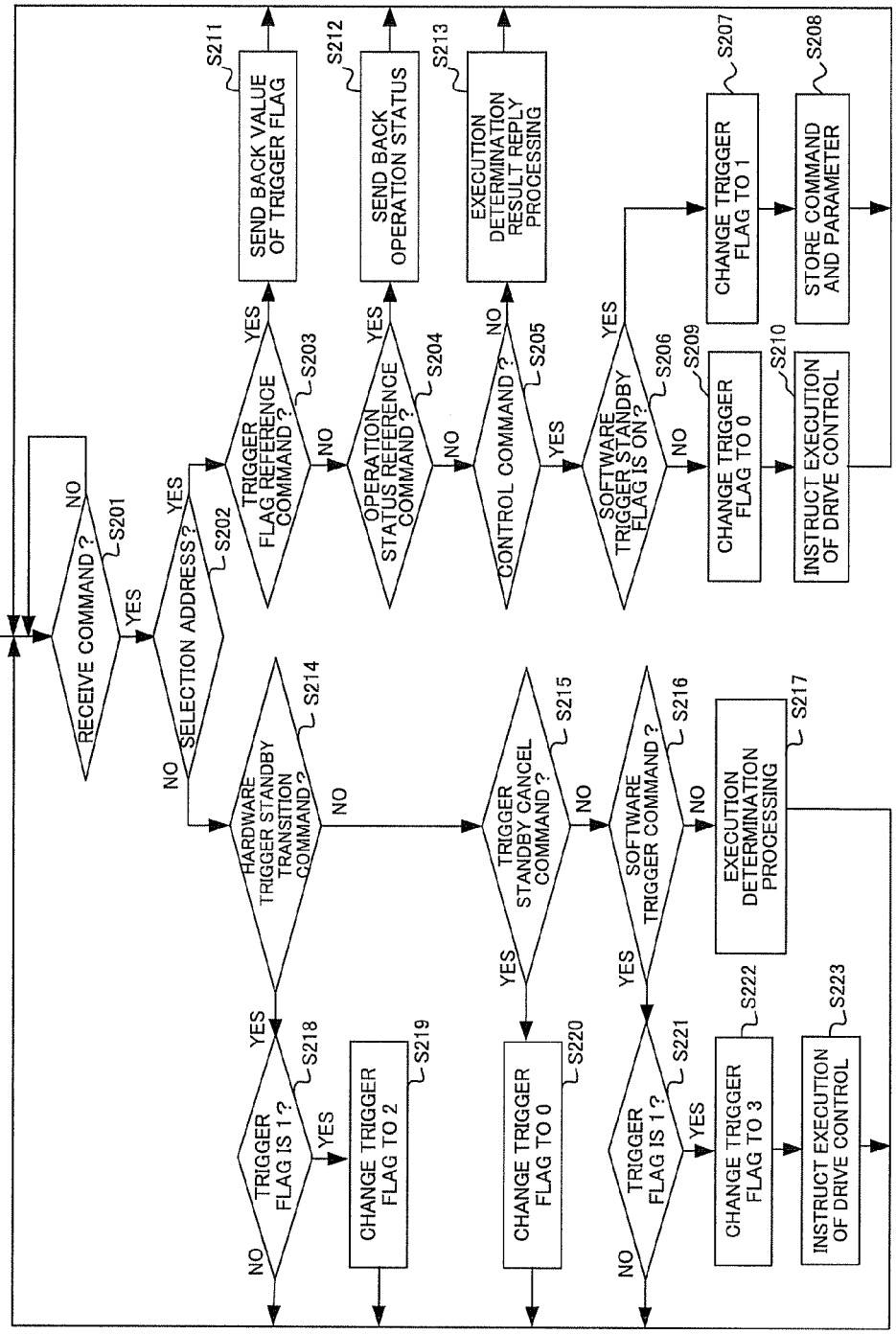
FIG. 8 is a flowchart illustrating operation of a command analysis section.

Next, operation of the command analysis section of the control device will be described. FIG. 8 is a flowchart illustrating operation of the command analysis section.

The command analysis section 205 acquires reception data transmitted from the personal computer 10 through the communication control section 201 and determines whether the address included in the reception data coincides with the address (all listen address, group listen address, or selection address) assigned to its own device, that is, whether transmission data including a command for its own device has been notified from the communication control section 201 (S201).

When determining that the address included in the notified reception data coincides with the address assigned to its own device (YES in S201), the command analysis section 205 determines whether the address included in the reception data is the selection address (S202).

When determining that the address is the selection address (YES in S202), the command analysis section 205 determines whether the command is the trigger flag reference command (S203).

When determining that the command is not the trigger flag reference command (NO in S203), the command analysis section 205 determines whether the command is the operation status reference command (S204).

When determining that the command is not the operation status reference command (No in S204), the command analysis section 205 determines whether the command is the position control command (S205).

When determining that the command is the control command (YES in S205), the command analysis section 205 determines whether the software trigger standby flag added as a parameter to the control command is ON (S206).

When determining that the software trigger standby flag is ON (YES in S206), the command analysis section 205 changes the trigger flag to 1 (i.e., software trigger standby status) (S207), stores the command and its parameters in the storage section 202, and transmits a reply to the personal computer 10 through the communication control section 201 (S208). After that, the command analysis section 205 determines once again whether transmission data including a command for its own device has been notified from the communication control section 201 (S201).

When determining that the software trigger standby flag is not ON, that is, the software trigger standby flag is OFF (NO in S206), the command analysis section 205 changes the trigger flag to 0 (i.e., non trigger standby status) (S209), instructs the drive control section 207 to execute the drive control based on the command and its parameters, and transmits a reply to the personal computer 10 through the communication control section 201 (S210). After that, the command analysis section 205 determines once again whether transmission data including a command for its own device has been notified from the communication control section 201 (S201).

When determining in step S205 that the command is not the control command (NO in S205), the command analysis section 205 executes execution determination result reply processing to be described later (S213) and, after that, determines once again whether transmission data including a command for its own device has been notified from the communication control section 201 (S201).

When determining in step S204 that the command is operation status reference command (YES in S204), the command analysis section 205 refers to the operation status of the drive control section 207 and sends back the operation status to the personal computer 10 (S212) and, after that, determines once again whether transmission data including a command for its own device has been notified from the communication control section 201 (S201).

When determining in step S203 that the command is the trigger flag reference command (YES in S203), the command analysis section 205 sends back a value of the trigger flag through the communication control section 201 to the personal computer 10 (S211) and, after that, determines once again whether transmission data including a command for its own device has been notified from the communication control section 201 (S201).

When determining in step S202 that the address is not the selection address (NO in S202), the command analysis section 205 determines whether the command is the hardware trigger standby transition command (S214).

When determining that the command is not the hardware trigger standby transition command (NO in S214), the command analysis section 205 determines whether the command is the trigger standby cancel command (S215).

When determining that the command is not the trigger standby cancel command (NO in S215), the command analysis section 205 determines whether the command is the software trigger issuance command (S216).

When determining that the command is not the software trigger command (NO in S216), the command analysis section 205 executes execution determination processing (S217) and, after that, determines once again whether transmission data including a command for its own device has been notified from the communication control section 201 (S201).

When determining that the command is the software trigger command (YES in S216), the command analysis section 205 determines whether the trigger flag is 1 (i.e., software trigger standby status) (S221).

When determining that the trigger flag is 1 (YES in S221), the command analysis section 205 changes the trigger flag to 3 (i.e., trigger issued status) (S222), instructs the drive control section 207 to start execution of control of the motor 30a based on the control command and its parameters stored in the storage section 202 (S223). After that, the command analysis section 205 determines once again whether transmission data including a command for its own device has been notified from the communication control section 201 (S201).

When determining that the trigger flag is not 1 (NO in S221), the command analysis section 205 determines once again whether transmission data including a command for its own device has been notified from the communication control section 201 (S201).

When determining in step S215 that the command is the trigger standby cancel command (YES in S215), the command analysis section 205 changes the trigger flag to 0 (i.e., non trigger standby status) (S220) and, after that, determines once again whether transmission data including a command for its own device has been notified from the communication control section 201 (S201).

When determining in step S214 that the command is the hardware trigger transition command (YES in S214), the command analysis section 205 determines whether the trigger flag is 1 (e.g., software trigger standby status) (S218).

When determining that the trigger flag is 1 (YES in S218), the command analysis section 205 changes the trigger flag to 2 (i.e., hardware trigger standby status) (S219) and, after that, determines once again whether transmission data including a command for its own device has been notified from the communication control section 201 (S201).

As described above, the personal computer 10 previously transmits to the drive control section 207 having a specified selection address the control command for the drive control section 207 to control the motor 30a and software trigger standby flag added to the control command as a parameter thereof. When receiving the software trigger standby flag which is set to ON, the command analysis section 205 changes the trigger flag to 1 and stores the control command and its parameters in the storage section 202. After that, when receiving the software trigger command, the command analysis section 205 changes the trigger flag to a trigger issued status and instructs the drive control section 207 to execute the drive control based on the control command and its parameters stored in the storage section 202.

Thus, a simple transmission of the software trigger command from the personal computer 10 to the control devices 20a to 20n allows the control devices to be started up based on the previously received different control commands and their parameters so as to control their corresponding motors. The control commands and their parameters are previously transmitted to the control devices 20a to 20n, respectively, so that the data amount of the command requiring the simultaneous start-up, that is, data amount of the software trigger command is correspondingly small. Thus, even if the personal computer 10 and control devices 20a to 20n are connected in a comparatively low speed communication system, the personal computer 10 can simultaneously start up the control devices 20a to 20n within a short time when it transmits the software trigger command and, accordingly, the control devices 20a to 20n can each return a reply to the received control command to the personal computer 10 within a short time.

The delay time from when the personal computer 10 transmits the software trigger command to when the control devices 20a to 20n actually start the control is always constant. Thus, even when it is necessary to start the control at a specified timing, it is possible to start the control at the specified timing accurately by transmitting the software trigger command at a timing earlier than the specified timing by the delay time.

Figure 9:
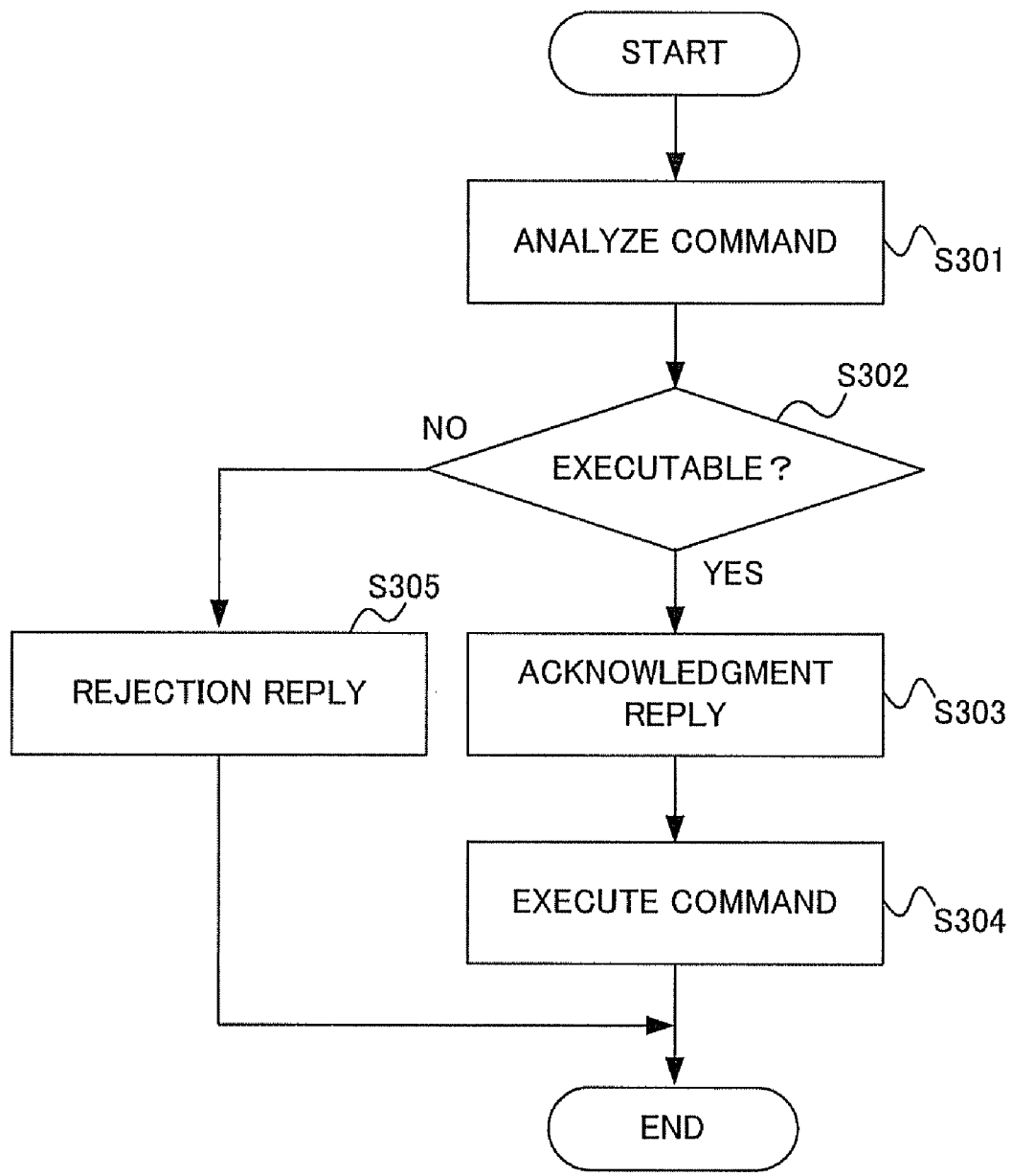
FIG. 9 is a flowchart illustrating operation performed in execution determination result reply processing.

Next, the execution determination result reply processing will be described. FIG. 9 is a flowchart illustrating operation performed in the execution determination result reply processing. FIG. 9 illustrates the operation performed in step S213 of FIG. 8.

The command analysis section 205 analyzes a command other than the trigger flag reference command, operation status reference command, and control command (S301) and determines whether the analyzed command can be executed (S302).

When determining that the command is executable (YES in S302), the command analysis section 205 sends back an acknowledgment reply to the personal computer 10 through the communication control section 201 (S303), and executes the command (S304).

When determining that the command is not executable (NO in S302), the command analysis section 205 sends back a rejection reply to the personal computer 10 through the communication control section 201 (S305).

Figure 10:
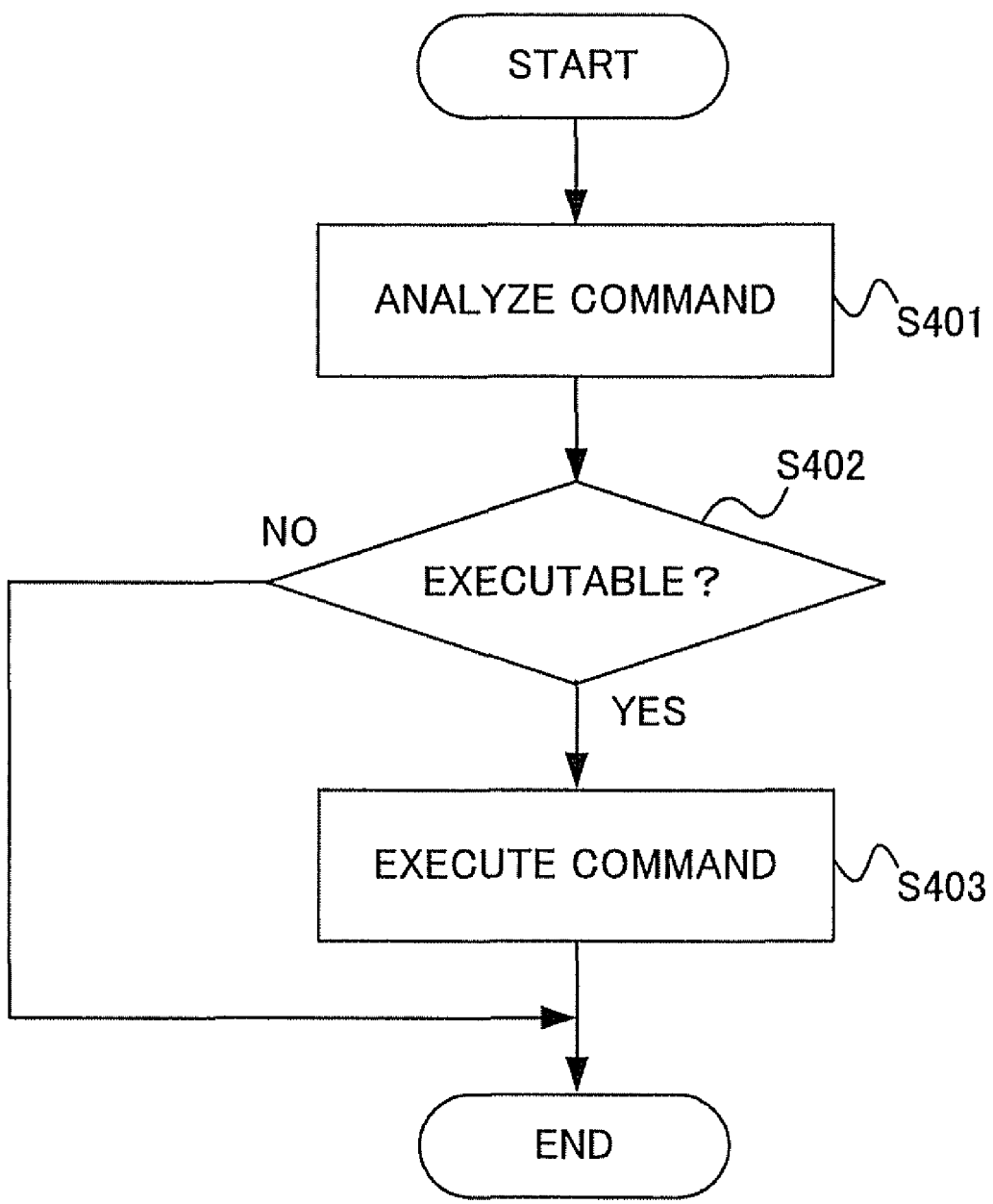
FIG. 10 is a flowchart illustrating operation performed in execution determination processing.

Next, the execution determination processing will be described. FIG. 10 is a flowchart illustrating operation performed in the execution determination processing. FIG. 10 illustrates the operation performed in step S217 of FIG. 8.

The command analysis section 205 analyzes a command other than the hardware trigger standby transition command, trigger standby cancel command, and software trigger command (S401) and determines whether the analyzed command can be executed (S402).

When determining that the command is executable (YES in S402), the command analysis section 205 executes the command (S403).

When determining that the command is not executable (NO in S402), the command analysis section 205 ends the execution determination processing without executing the command.

As described above, with regard to the command transmitted using the selection address, the control device 20a can notify the personal computer 10 of determination made by the command analysis section 205 on whether the command can be executed.

Figure 11:
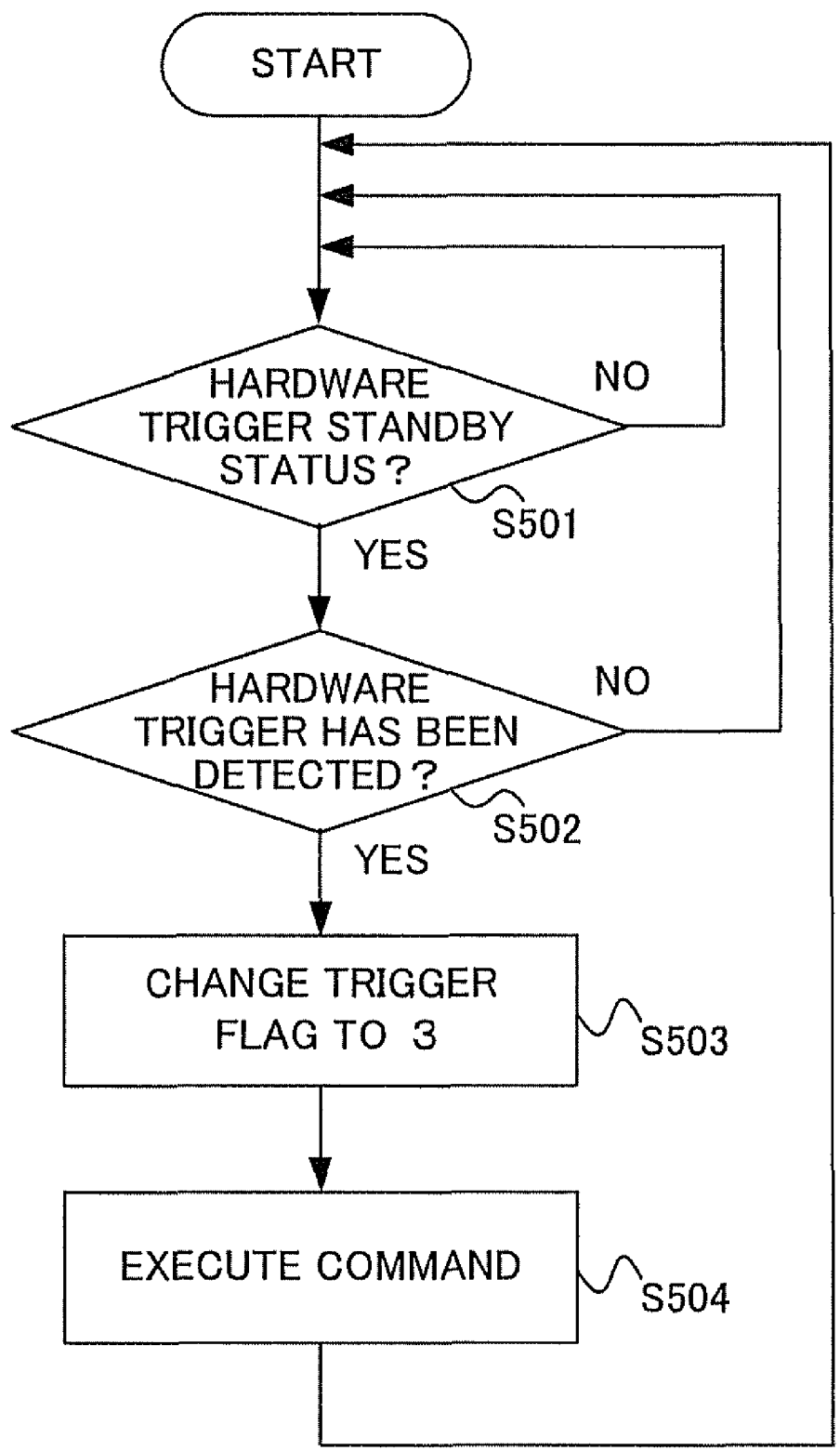
FIG. 11 is a flowchart illustrating operation of a hardware trigger reception section.

Next, operation of the hardware trigger reception section of the control device will be described. FIG. 11 is a flowchart illustrating operation of the hardware trigger reception section.

The hardware trigger reception section 206 determines whether the trigger flag of the command analysis section 205 is 2 (i.e., hardware trigger standby status) (S501).

When determining that the trigger flag of the command analysis section 205 indicates the hardware trigger standby status (YES in S501), the hardware trigger reception section 206 determines whether the hardware trigger has been detected, that is, whether the signal from the hardware switch 60 has been changed from FALSE to TRUE (S502).

When determining that the hardware trigger has been detected, that is, a TRUE signal has been input from the hardware switch 60 (YES in S502), the hardware trigger reception section 206 changes the trigger flag of the command analysis section 205 to 3 (i.e., trigger issued status) (S503), instructs the drive control section 207 to start the control based on the control command and its parameters stored in the storage section 202 (S504), and, after that, determines once again whether the trigger flag of the command analysis section 205 is 2 (i.e., hardware trigger standby status) (S501).

When determining that the hardware trigger has not been detected, that is, a FALSE signal has been input from the hardware switch 60 (NO in S502), the hardware trigger reception section 206 determines once again whether the trigger flag of the command analysis section 205 is 2 (i.e., hardware trigger standby status) (S501).

When determining in step S501 that the trigger flag of the command analysis section 205 does not indicate the hardware trigger standby status (NO in S501), the hardware trigger reception section 206 determines once again whether the trigger flag of the command analysis section 205 is 2 (i.e., hardware trigger standby status) (S501).

As described above, the trigger flag of the command analysis section 205 is previously set to the hardware trigger standby status, and the hardware trigger reception section 206 receives the hardware trigger, i.e., TRUE signal from the hardware switch 60, whereby the control devices 20a to 20n connected to the hardware switch 60 can allow their drive control sections 207 to start the control of the motors 30a to 30n simultaneously. With the above operation, it is possible to carry out the start-up upon occurrence of the hardware trigger condition due to absence of communication time delay. Further, it is possible to carry out the start-up based on an instruction from a device other than the personal computer 10, i.e., sensor information or the like from an external device. Further, by connecting different sensors to the control devices 20a to 20n, respectively, the motors 30a to 30n can be started up at different timings. Further, a use of a push-button switch as a device for inputting the hardware trigger allows a user to determine the timing of the simultaneous start-up. Further, issuance of the hardware trigger standby transition command after all the conditions of the simultaneous start-up has been satisfied allows the trigger input to be effective.

Figure 12:
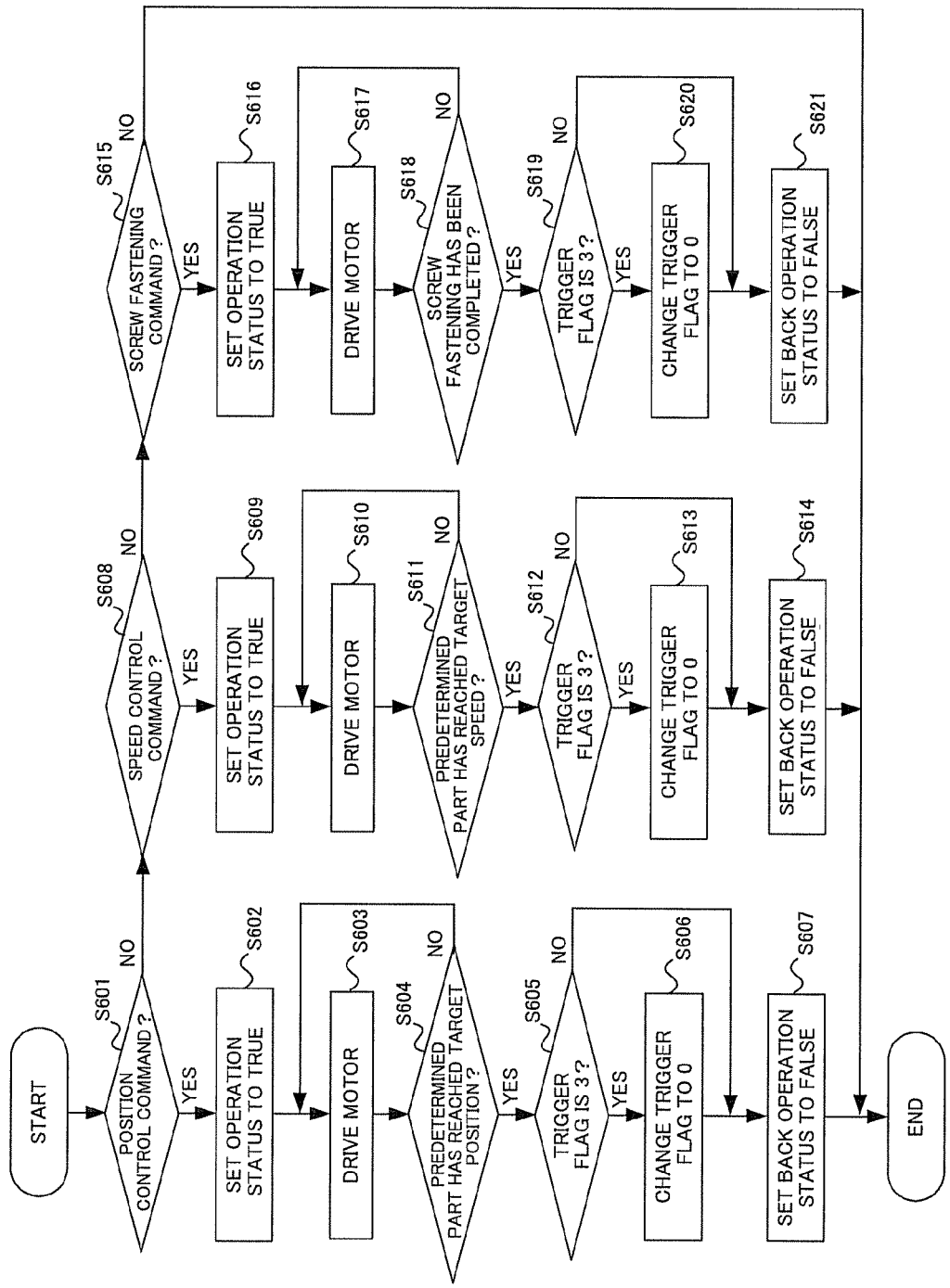
FIG. 12 is a flowchart illustrating operation of a drive control section.
Figure 13:
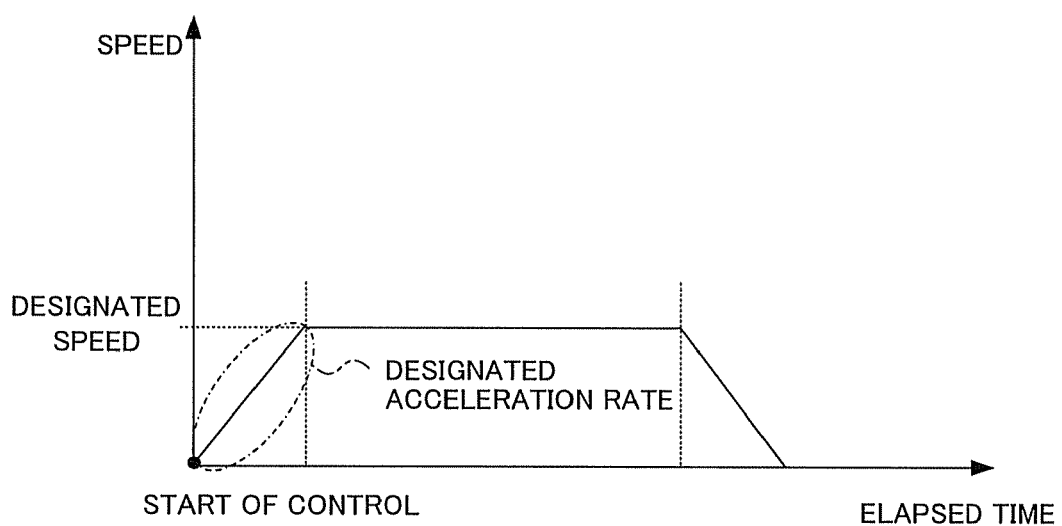
FIG. 13 is a graph illustrating a relationship between the moving speed achieved by a motor controlled based on a position control command and time.

Next, operation of the drive control section of the control device will be described. FIG. 12 is a flowchart illustrating operation of the drive control section. FIG. 13 is a graph illustrating a relationship between the moving speed achieved by the motor controlled based on the position control command and time. In FIG. 12, it is assumed that the drive control section has already received a notification of the control command and its parameters from the command analysis section or hardware trigger reception section. Further, for illustrative purposes, it is assumed that all the control commands are executed by the motor 30a. That is, even a control command to be executed by different motor, it is assumed to be executed by the motor 30a.

The drive control section 207 determines whether the notified control command is the position control command (S601).

When determining that the notified control command is the position control command (YES in S601), the drive control section 207 sets its operation status to TRUE indicating that the drive control section 207 is in operation (S602), generates a trapezoidal speed curve as illustrated in FIG. 13 based on the parameters of the position control command that indicate a target position, a designated moving speed, and a designated acceleration rate, drives the motor 30a (S603), and determines whether a predetermined part, e.g., the screw fastening device moved by the motor 30a has reached a target position (S604).

When determining that the predetermined part has reached a target position (YES in S604), the drive control section 207 determines whether the trigger flag of the command analysis section 205 is 3 (i.e., trigger issued status) (S605).

When determining that the trigger flag of the command analysis section 205 indicates the trigger issued status (YES in S605), the drive control section 207 changes the trigger flag of the command analysis section 205 to 0 (i.e., non trigger standby state) (S606) and changes its operation status to FALSE (S607).

When determining that the trigger flag of the command analysis section 205 does not indicate the trigger issued status (NO in S605), the drive control section 207 changes its operation status to FALSE (S607).

When determining in step S604 that the predetermined part has not reached a target position (NO in S604), the drive control section 207 continues driving the motor 30a (S603).

When determining that the notified control command is not the position control command (NO in S601), the drive control section 207 determines whether the notified control command is the speed control command (S608).

When determining the notified command is the speed control command (YES in S608), the drive control section 207 sets its operation state to TRUE indicating that the drive control section 207 is in operation (S609), increase or decrease the speed of the motor 30a that has already been driven based on the parameters of the position control command that indicate a designated moving speed and a designated acceleration rate (S610), and determines whether the moving speed of the predetermined part moved by the motor 30a has reached the designated speed (S611).

When determining that the moving speed of the predetermined part has reached the designated speed (YES in S611), the drive control section 207 determines whether the trigger flag of the command analysis section 205 is 3 (i.e., trigger issued status) (S612).

When determining that the trigger flag of the command analysis section 205 indicates the trigger issued status (YES in S612), the drive control section 207 changes the trigger flag of the command analysis section 205 to 0 (i.e., non trigger standby state) (S613) and changes its operation status to FALSE (S614).

When determining that the trigger flag of the command analysis section 205 does not indicate the trigger issued status (NO in S612), the drive control section 207 changes its operation status to FALSE (S614).

When determining in step S611 that the moving speed of the predetermined part has not reached the designated speed (NO in S611), the drive control section 207 continues increasing or decreasing the drive speed of the motor 30a (S610).

When determining in step S608 that the notified control command is not the speed control command (NO in S608), the drive control section 207 determines whether the notified control command is the screw fastening control command (S615).

When determining that the notified control command is the screw fastening control command (YES in S615), the drive control section 207 sets its operation state to TRUE indicating that the drive control section 207 is in operation (S616), drives the motor 30a so as to rotate a driver for screw fastening based on the parameters of the screw fastening control command that indicate a final fastening torque and a bit rotation speed (S617), and determines whether the screw fastening has been completed (S618).

When determining that that the screw fastening has been completed (YES in S618), the drive control section 207 determines whether the trigger flag of the command analysis section 205 is 3 (i.e., trigger issued status) (S619).

When determining that the trigger flag of the command analysis section 205 indicates the trigger issued status (YES in S619), the drive control section 207 changes the trigger flag of the command analysis section 205 to 0 (i.e., non trigger standby state) (S620) and changes its operation status to FALSE (S621).

When determining that the trigger flag of the command analysis section 205 does not indicate the trigger issued status (NO in S619), the drive control section 207 changes its operation status to FALSE (S621).

When determining in step S618 that the screw fastening has not been completed (NO in S618), the drive control section 207 continues driving the motor 30a that rotates a driver for screw fastening (S617).

When determining that the notified control command is not the screw fastening control command (NO in S615), the drive control section 207 ends the drive control of the motor 30a.

With above operation, the personal computer 10 can allow all the control devices 20a to 20n to start up the motors 30a to 30n simultaneously. Further, the personal computer 10 can allow a specified number of control devices 20a and 20b to start up the motors 30a and 30b simultaneously.

Second Embodiment

In the above first embodiment, the following control procedure is employed: the software trigger standby flag value is added as a parameter to the control command transmitted for each of the control devices based on the selection address; the resultant control command is stored in the control device; and the control device is made to suspend execution of the control command stored therein until the software trigger command is transmitted from the personal computer. In the present embodiment, as described later, a command for each of the control devices to suspend execution thereof is transmitted to the plurality of control devices based on the all listen address or group listen address. In the following, only the configuration and operation different from those of the first embodiment will be described with reference to the drawings.

Figure 14:
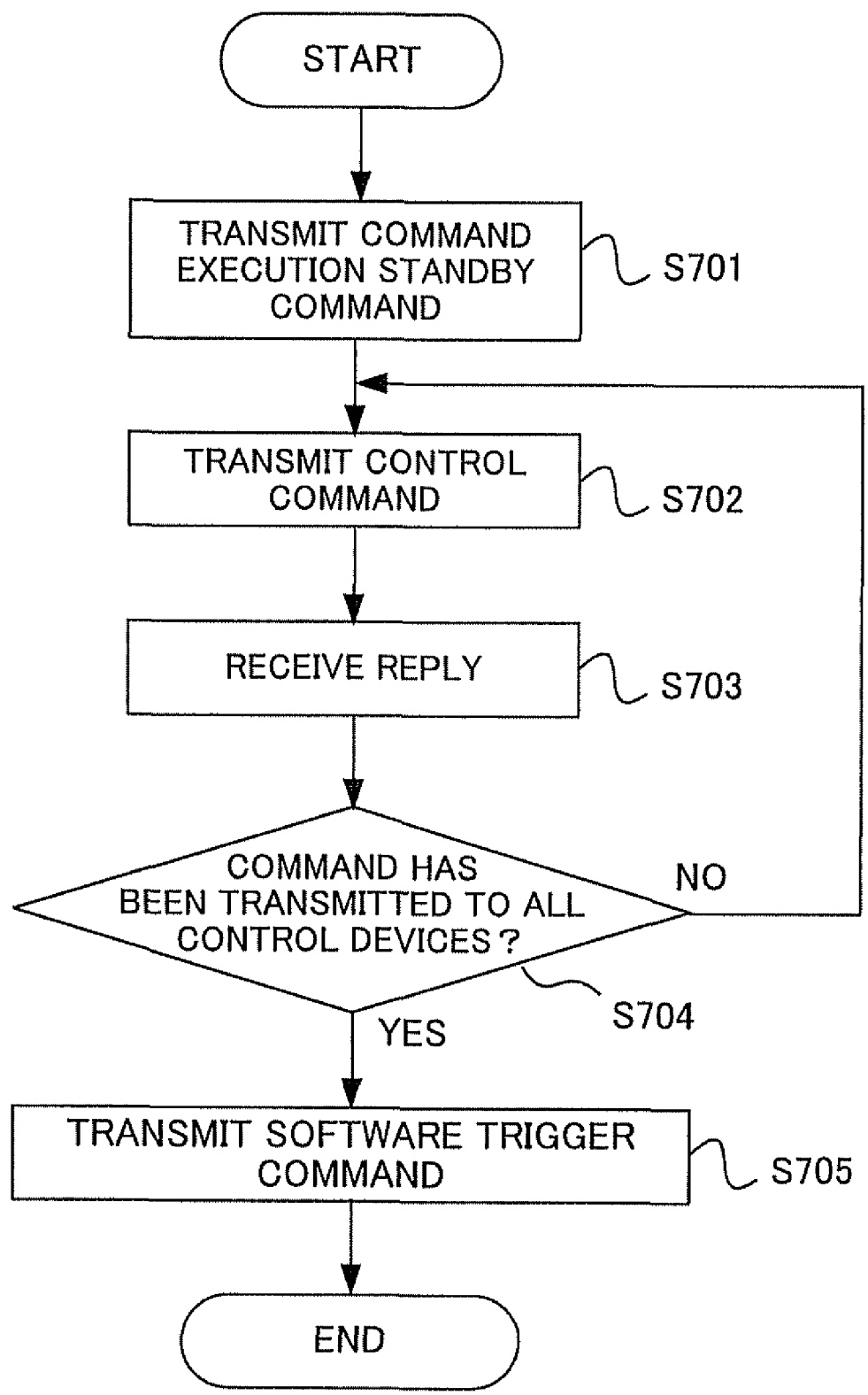
FIG. 14 is a flowchart illustrating operation of the personal computer according to a second embodiment.

In terms of the operation of the personal computer, the second embodiment differs from the first embodiment in that the control section controls the transmission/reception section to transmit a command execution standby command to be described later to the control devices. The command execution standby command is a command for the control device to suspend execution of a subsequent command. FIG. 14 is a flowchart illustrating operation of the personal computer according to the present embodiment. Although the personal computer transmits the command execution standby command to all the control devices using the all listen address in the example of FIG. 14, it may transmit the command execution standby command to a specified control device (or specified control devices) using the group listen address.

The control section 102 of the personal computer 10 controls the transmission/reception section 101 such that it transmits the command execution standby command to all the control devices 20a to 20n using the all listen address (S701), transmits the control command to any of the control devices 20a to 20n (S702), and receives a replay to the control command (S703). After that, the control section 102 determines whether the control command has been transmitted to all the control devices 20a to 20n (S704).

When determining that the control command has been transmitted to all the control devices 20a to 20n (YES in S704), the control section 102 makes the transmission/reception section 102 transmit the software trigger command (S705).

When determining that the control command has not been transmitted to all the control devices 20a to 20n (NO in S704), the control section 102 makes the transmission/reception section 101 transmit the control command to any of the control devices 20a to 20n once again (S702).

Figure 15:
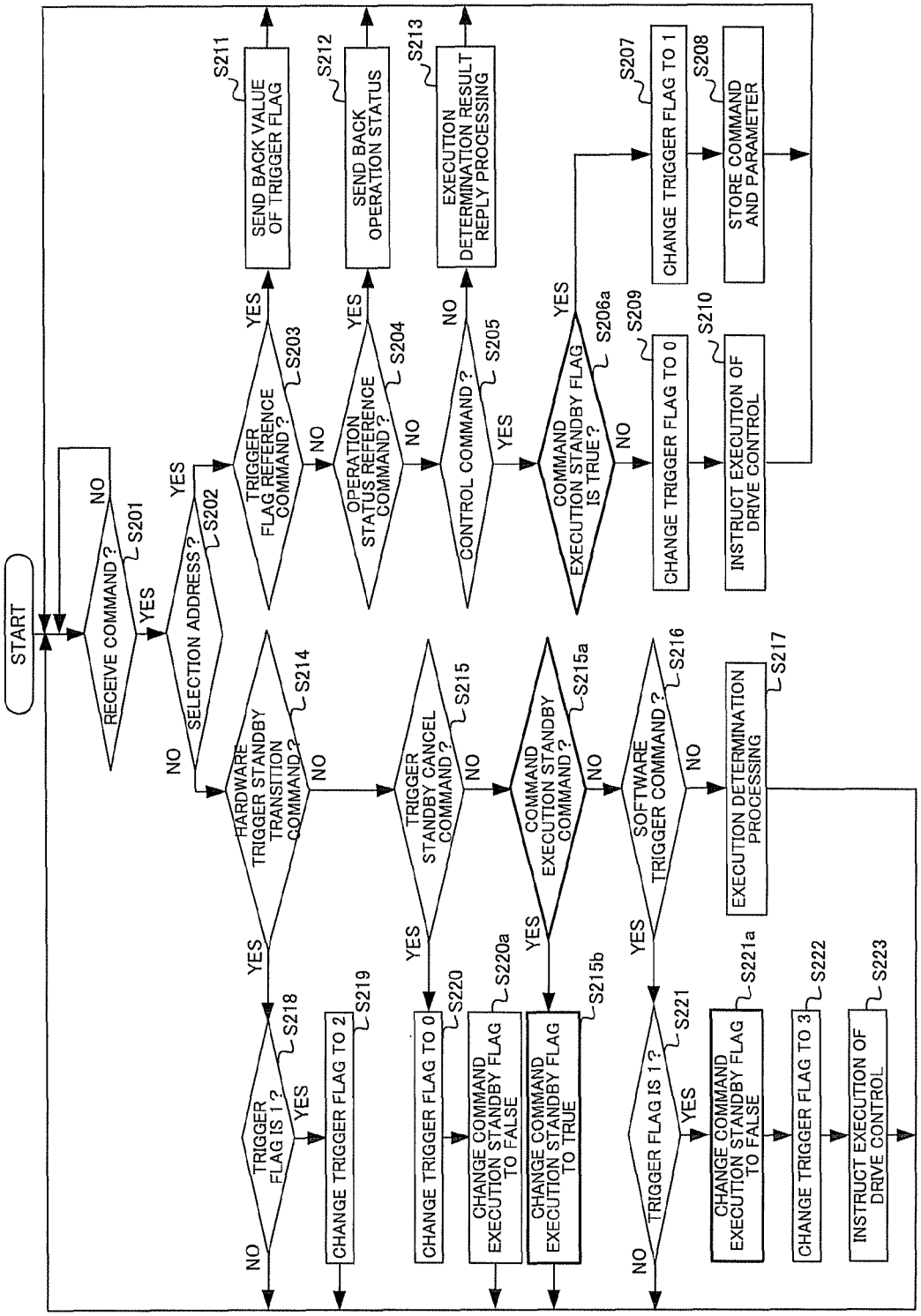
FIG. 15 is a flowchart illustrating operation of the command analysis section according to the second embodiment.

Next, the configuration and operation of the command analysis section different from those of the first embodiment will be described. In terms of the configuration of the control device, the second embodiment differs from the first embodiment in that the command analysis section retains a command execution standby flag. FIG. 15 is a flowchart illustrating operation of the command analysis section according to the present embodiment. In the flowchart of FIG. 15, the command analysis section of the present embodiment performs the same processing as the command analysis section of the first embodiment in the steps having the same reference numerals as those in FIG. 8, and only the processing different from that in the first embodiment and processing directly relating thereto will be described. Further, in the present embodiment, it is assumed that the personal computer transmits the command execution standby command to the control device and that the command execution standby flag has a value of TRUE or FALSE.

In step S215, the command analysis section 205 determines whether the command is the trigger standby cancel command (S215). When determining that the command is the trigger standby cancel command (YES in S215), the command analysis section 205 changes the trigger flag to 0 (i.e., non trigger standby status) (S220) and changes the command execution standby flag to FALSE (S220a).

When determining that the command is not the trigger standby cancel command (NO in S215), the command analysis section 205 determines whether the command is the command execution standby command (S215a).

When determining that the command is the command execution standby command (YES in S215a), the command analysis section 205 changes the command execution standby flag to TRUE (S215b). When determining that the command is not the command execution standby command (NO in S215a), the command analysis section 205 determines whether the command is the software trigger command (S216).

In step S221, the command analysis section 205 determines whether the trigger flag is 1 and, when determining that the trigger flag is 1 (YES in S221), the command analysis section 205 changes the command execution standby flag to FALSE (S221a).

In step S205, the command analysis section 205 determines whether the command is the position control command and, when determining that the command is the position control command (YES in S205), the command analysis section 205 determines whether the command execution standby flag is TRUE (S206a).

When determining that the command execution standby flag is TRUE (YES in S206a), the command analysis section 205 changes the trigger flag to 1 (i.e., software trigger standby status) (S207) and stores the command and its parameters in the storage section 202 (S208). After that, the command analysis section 205 determines once again whether transmission data including a command for its own device has been notified from the communication control section 201 (S201).

When determining that the command execution standby flag is not TRUE (NO in S206a), the command analysis section 205 changes the trigger flag to 0 (i.e., non trigger standby status) (S209), instructs the drive control section 207 to execute the drive control based on the command and its parameters, and sends back a reply to the personal computer 10 through the communication control section 201 (S210). After that, the command analysis section 205 determines once again whether transmission data including a command for its own device has been notified from the communication control section 201 (S201).

As described above, in the present embodiment, in place of adding the value of the software trigger standby flag as a parameter of the control command, the command execution standby command is used to previously change the command execution standby flag to TRUE and, when the command execution standby flag is TRUE, the control command and its parameters are stored in the storage section 202. Then, by transmitting the software trigger command to the control devices using the all listen address or group listen address, it is possible to allow the control devices to execute respective different control commands. This procedure eliminates the need to add the software trigger standby flag as a parameter of the control command. Further, the command execution standby command is transmitted using the all listen address or group listen address, so that it is not necessary to make the control devices to wait individually.

Third Embodiment

Figure 16:
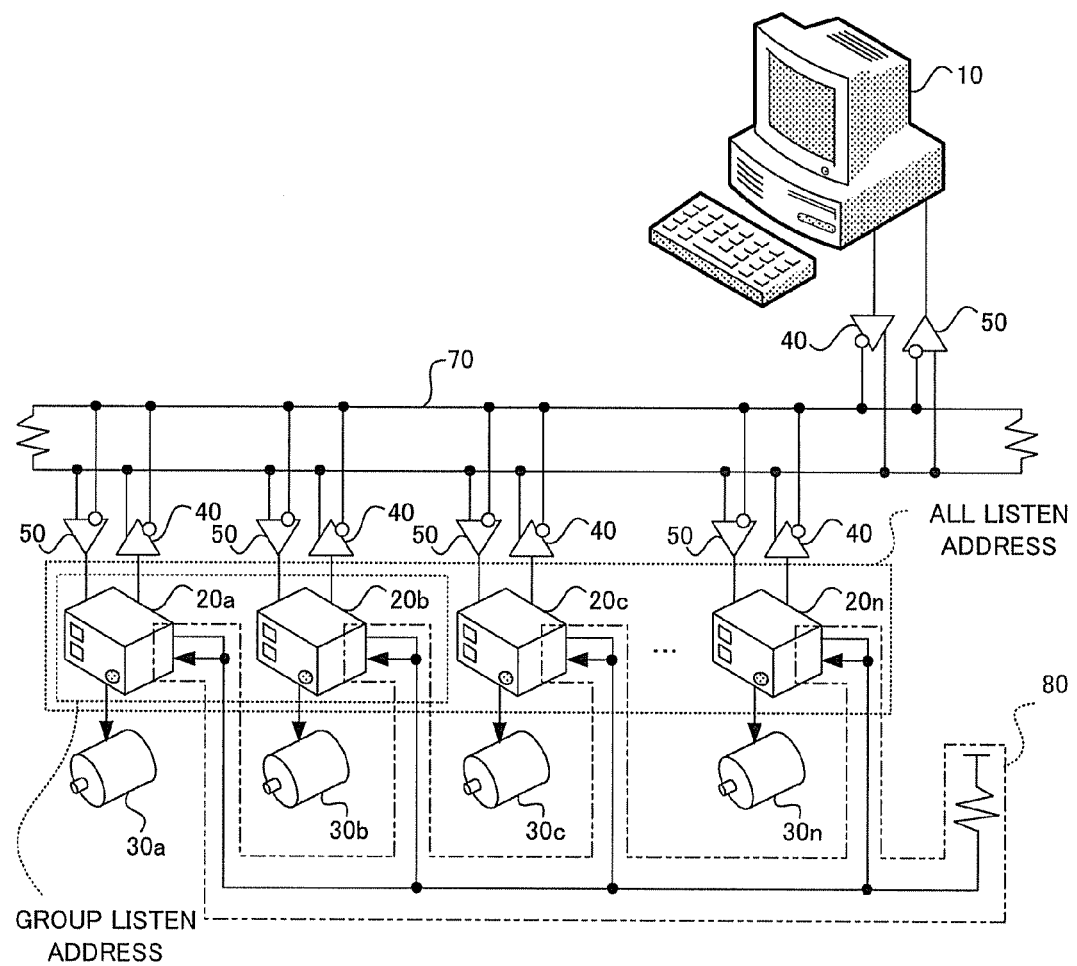
FIG. 16 is a view illustrating a configuration of the control system according to a third embodiment.
Figure 17:
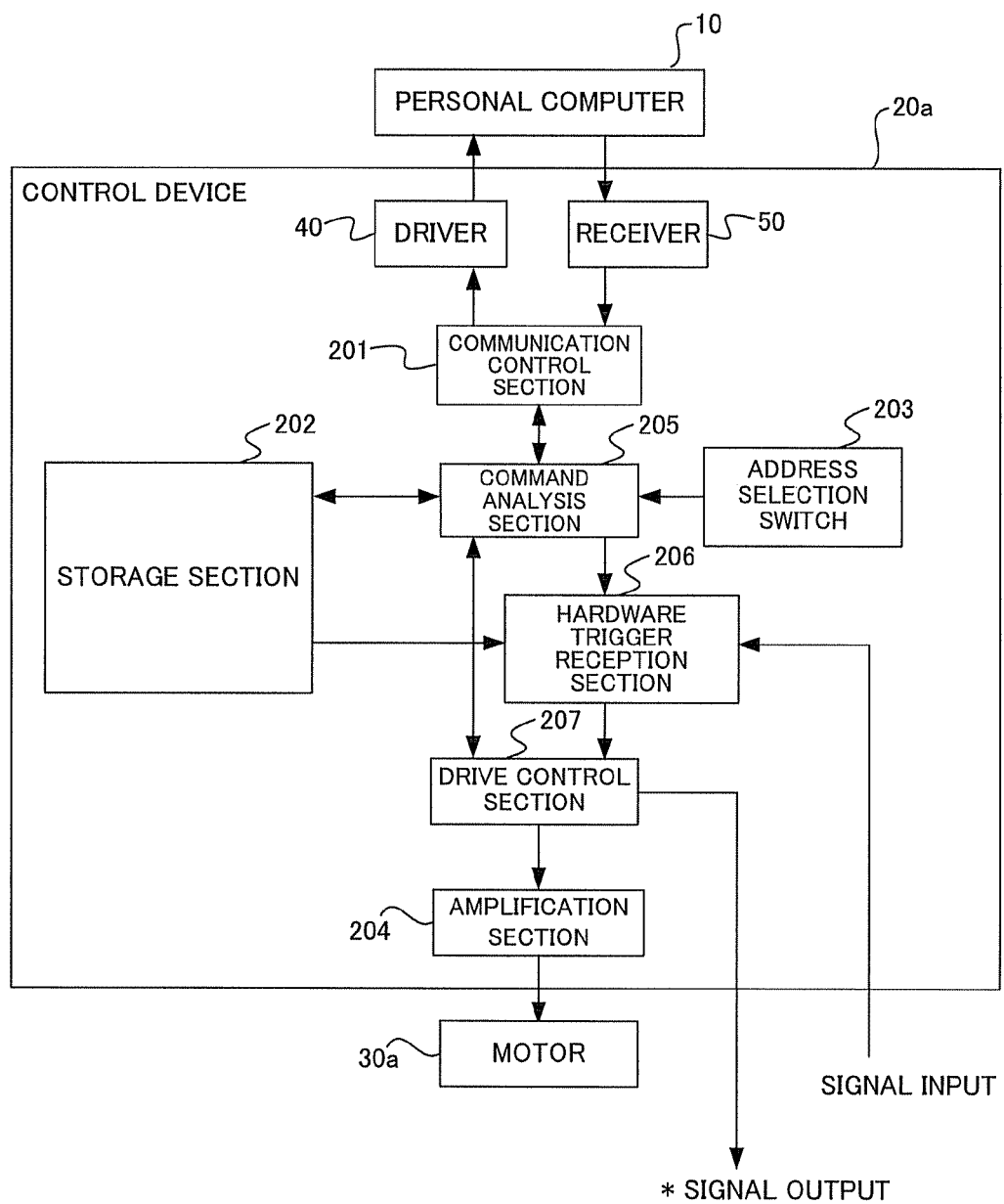
FIG. 17 is a view illustrating a configuration of the control device according to the third embodiment.

In the above first and second embodiment, the control devices 20a to 20n use a trigger signal transmitted from the hardware switch 60 as the hardware trigger, while in the present embodiment, the control devices 20a to 20n use a signal output from a wired OR line as the hardware trigger. FIG. 16 is a view illustrating a configuration of the control system according to the present embodiment. FIG. 17 is a view illustrating a configuration of the control device according to the present embodiment.

The control system of the present embodiment differs from those of the first and second embodiments in that not the hardware switch 60 but a wired OR line 80 (monitoring section) is connected to the control devices 20a to 20n. The control devices 20a to 20n output to the wired OR line 80 a negative logic signal as a signal indicating that they are in operation, and the wired OR line 80 outputs to all the control devices 20a to 20n a signal as the hardware trigger after the completion of the operation of all the control devices 20a to 20n.

More specifically, as illustrated in FIG. 17, the drive control section 207 outputs LOW as a negative logic signal while it drives the motor 30a and outputs HIGH as the negative logic signal while it does not drive the motor 30a. When the signal from any of the control devices 20a to 20n is LOW (TRUE), the OR operation value is LOW, so that the wired OR line 80 inputs LOW in the hardware trigger reception section 206. On the other hand, when the signals from all the control devices 20a to 20n are HIGH (FALSE), the OR operation value is HIGH, so that the wired OR line inputs HIGH in the hardware trigger reception section 206. The hardware trigger reception section 206 recognizes the HIGH input from the wired OR line 80 as the hardware trigger.

Figure 18:
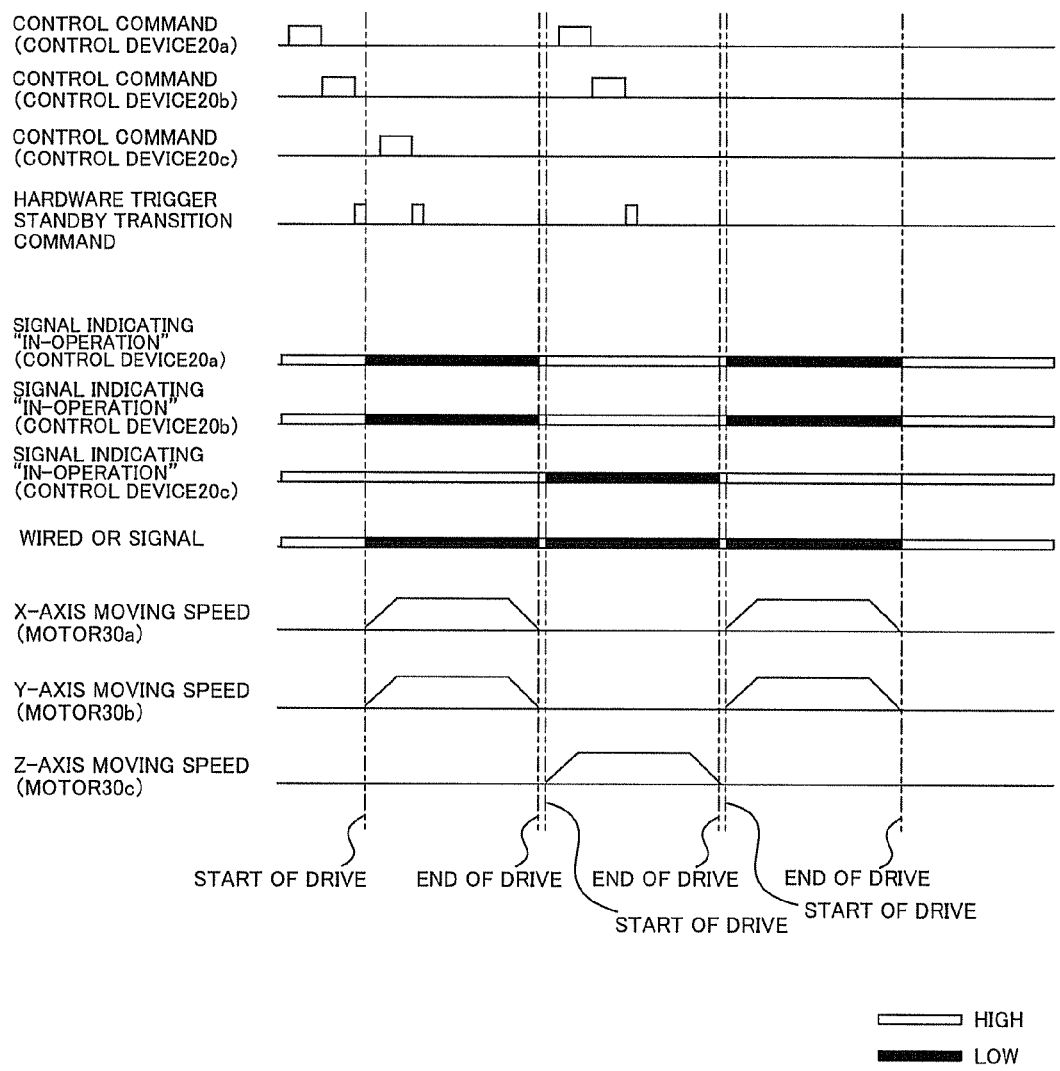
FIG. 18 is a view illustrating an example of operation of the control system according to the third embodiment.
Figure 19:
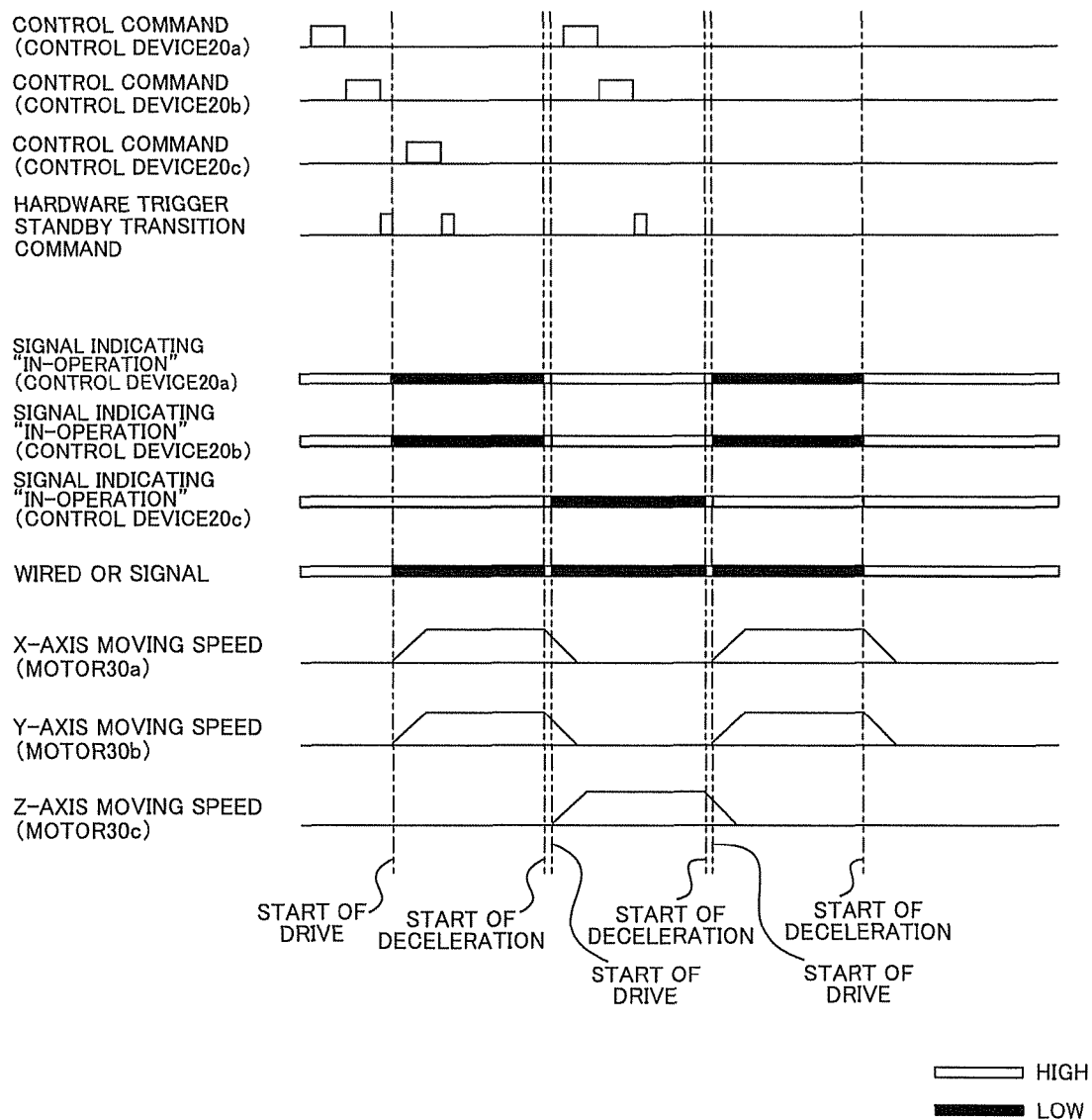
FIG. 19 is a view illustrating another example of operation of the control system according to the third embodiment.
Figure 20:
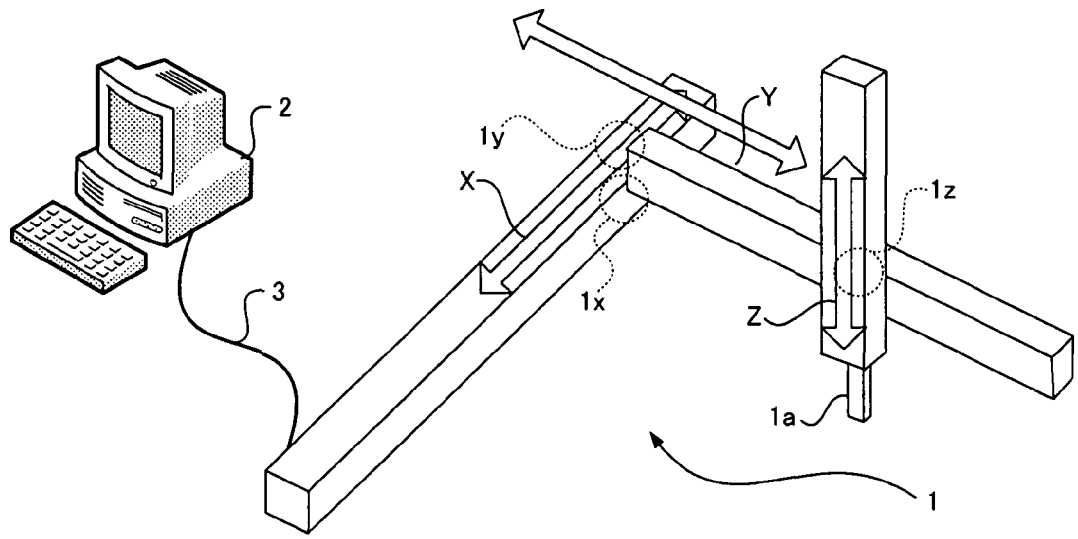
FIG. 20 is a view illustrating a control system using conventional serial communication.
Figure 21:
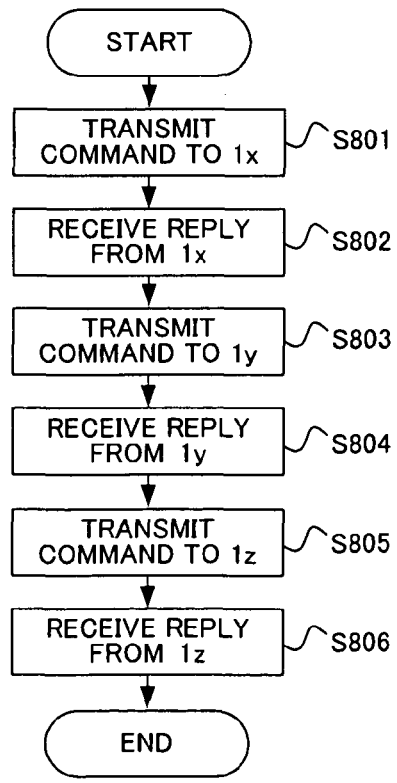
FIG. 21 is a flowchart illustrating operation of a master device in a control system using conventional serial communication.

Next, operation of the control system according to the present embodiment will be described. FIG. 18 is a view illustrating an example of operation of the control system according to the present embodiment. FIG. 19 is a view illustrating another example of the operation of the control system according to the present embodiment. For convenience of explanation, in the examples of FIGS. 18 and 19, it is assumed that the control devices 20a to 20c are connected to the personal computer 10 and that the motor 30a, motor 30b, and motor 30c move a predetermined device in the X-axis, Y-axis, and Z-axis directions, respectively. Further, it is assumed that the personal computer has transmitted the position control command together with the software trigger standby flag having a value of ON immediately before the transmission of the hardware trigger standby transition command.

As illustrated in FIG. 18, under the condition that all the control devices 20a to 20c do not drive the motors and output HIGH, that is, when the wired OR line 80 outputs HIGH, the control devices 20a to 20c immediately cancel the hardware trigger standby status induced by the hardware trigger standby transition command and executes a previously transmitted control command. Under the condition that any of the control devices 20a to 20c drive the motors and output LOW, that is, when the wired OR line 80 outputs LOW, the control devices 20a to 20c do not cancel the hardware trigger standby status induced by the hardware trigger standby transition command until the wired OR line 80 outputs HIGH. When the wired OR line 80 outputs HIGH, the personal computer 10 periodically (or with adequate intervals if another processing needs to be executed) transmits the operation status reference command to the control devices 20a to 20c after issuance of the hardware trigger standby transition command, refers to the trigger flag to confirm that the hardware trigger standby state has been canceled, and transmits the control command to be executed next.

Further, as illustrated in FIG. 19, when a configuration is adopted in which the control devices 20a to 20c output LOW during a time period from the start of the motor drive to start of deceleration of the motor, it is possible to allow execution of the control command to be executed next which is in a hardware standby state using the start of the deceleration of the motors by all the control devices 20a to 20c as the hardware trigger.

As described above, by using the end of the motor drive by all the control devices 20a to 20c or a signal change at a predetermined timing, such as the deceleration start, as the hardware trigger, it is possible to carry out the next action immediately after the completion of the operation of all axes or start of deceleration thereof. With this method, operation of a part requiring high-speed processing can be switched using the hardware trigger, so that high-speed and economical operation can be achieved even in a low-speed and inexpensive serial communication system with reduced wiring.

Further, it is possible to provide a program that allows a computer constituting a master device to execute the above steps as a master program. By storing the above program in a computer-readable storage medium, it is possible to allow a computer constituting the determination device to execute the program. The computer-readable storage medium mentioned here includes: an internal storage device mounted in a computer, such as ROM or RAM, a portable storage medium such as a CD-ROM, a flexible disk, a DVD disk, a magneto-optical disk, or an IC card; a database that holds computer program; another computer and database thereof; and a transmission medium on a network line.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiment(s) of the present inventions have been described in detail, it should be understood that the various changes, substitutions, and alterations could be made hereto without departing from the spirit and scope of the invention.

What is claimed is:
1. A control system comprising:
a master device that includes:
a first transmission section that transmits, to a plurality of slave devices connected thereto through a network, a control command for the slave devices to control a device to be controlled and a flag that have two or more values; and a second transmission section that transmits, to the plurality of slave devices, a control start command for the slave devices to simultaneously start performing control based on the control command transmitted by the first transmission section, and a slave device that includes:

a reception section that receives the control command and flag transmitted from the master device;

a control command storage section that stores the control command received by the reception section in a storage section in the case where the flag received by the reception section has a specified value; and a first control start section that receives the control start command transmitted from the master device and starts performing control of the device to be controlled based on the control command stored in the storage section using the control start command as a trigger; and a monitoring section that monitors the operation status of the device to be controlled, wherein the first control start section starts the control of the device to be controlled based on a monitoring result of the monitor section.

2. The control system according to claim 1, wherein the second transmission section transmits the control start command to the plurality of slave devices by multicasting through the network.

3. The control system according to claim 1, wherein the second transmission section transmits the control start command to a specified number of the slave devices.

4. The control system according to claim 1, wherein the slave device further comprises a second control start section that receives a signal transmitted from an output device outputting a signal that has two or more values and starts the control of the device to be controlled based on the control command stored in the storage section in the case where the signal has a specified value.

5. The control system according to claim 4, wherein the output device is a sensor.

6. The control system according to claim 1, wherein the master device further comprises a third transmission section that previously transmits, to the plurality of slave devices, a standby command for making the slave devices store the control command received by the reception section in the storage section.

7. A control method by which a plurality of slave devices connected to a master device through a network can each control a device to be controlled, the method comprising:

transmitting, from the master device to the slave devices side, a control command for the slave devices to control a device to be controlled and a flag that have two or more values;

receiving on the slave device side the control command and flag transmitted by the transmitting of a control command;

storing the control command received by the receiving of a control command and flag in a slave devices side storage section in the case where the flag received by the receiving of a control command and flag has a specified value;

transmitting, from the master device to slave devices side, a control start command for the slave devices to simultaneously start performing control based on the control command transmitted by the transmitting of a control command;

receiving the control start command transmitted by the transmitting of a control start command;

performing, on the slave devices side, control of the device to be controlled based on the control command stored in the storage section using the control start command as a trigger;

monitoring the operation status of the device to be controlled; and starting the control of the device to be controlled based on a monitoring result of the monitoring.

8. The control method according to claim 7, wherein the transmitting of a control start command transmits the control start command to the plurality of slave devices by multicasting through the network.

9. The control method according to claim 7, wherein the transmitting of a control start command transmits the control start command to a specified number of the slave devices.

10. The control method according to claim 7, further comprising:

receiving, on the slave devices side, a signal transmitted from an output device connected to the slave devices; and outputting a signal that have two or more values and starts performing, on the slave device side, the control of the device to be controlled based on the control command stored in the storage section in the case where the signal has a specified value.

11. The control method according to claim 7, further comprising:

transmitting previously, from the master device side to the slave devices side, a standby command for making the slave devices store the control command received by the receiving of a control command and flag in the storage section.

12. A master device comprising:

a first transmission section that transmits, to a plurality of slave devices connected thereto through a network, a control command for the slave devices to control a device to be controlled and a flag that have two or more values, the flag making the slave devices to suspend execution of the control of the device to be controlled based on the control command when it has a specified value;

a second transmission section that transmits, to the plurality of slave devices, a control start command for the slave devices that are made to suspend execution of the control of the device to be controlled by the flag transmitted from the first transmission section and having a specified value to simultaneously start performing the control of the device to be controlled based on the control command transmitted by the first transmission section; and a third transmission section that previously transmits, to the plurality of slave devices, a standby command for making the slave devices store the control command received by the reception section in the storage section.

13. The master device according to claim 12, wherein the second transmission section transmits the control start command to the plurality of slave devices by multicasting through the network.

14. The master device according to claim 12, wherein the second transmission section transmits the control start command to a specified number of the slave devices.

15. A control device comprising:

a reception section that receives a control command for controlling a device to be controlled and a flag that have two or more values which are transmitted from a master device connected thereto through a network;

a control command storage section that stores the control command received by the reception section in a storage section in the case where the flag received by the reception section has a specified value;

a first control start section that receives the control start command transmitted from the master device and starts performing control of the device to be controlled based on the control command stored in the storage section using the control start command as a trigger; and a monitoring section that monitors the operation status of the device to be controlled, wherein the first control start section starts the control of the device to be controlled based on a monitoring result of the monitor section.

16. The control device according to claim 15, further comprising a second control start section that receives a signal transmitted from an output device connected thereto and outputting a signal that have two or more values and starts the control of the device to be controlled based on the control command stored in the storage section in the case where the signal has a specified value.

* * * * *